United States Patent
Wang et al.

(10) Patent No.: US 12,165,414 B2
(45) Date of Patent: *Dec. 10, 2024

(54) METHODS AND SYSTEMS FOR DETERMINING OBJECT ACTIVITY WITHIN A REGION OF INTEREST

(71) Applicant: Comcast Cable Communications, LLC, Philadelphia, PA (US)

(72) Inventors: Hongcheng Wang, Arlington, VA (US); Rui Min, Vienna, VA (US); Hong Li, Mount Laurel, NJ (US); Ruichi Yu, College Park, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,028

(22) Filed: Oct. 4, 2023

(65) Prior Publication Data
US 2024/0037953 A1    Feb. 1, 2024

Related U.S. Application Data

(63) Continuation of application No. 17/691,695, filed on Mar. 10, 2022, now Pat. No. 11,816,899, which is a
(Continued)

(51) Int. Cl.
*G06V 20/52*    (2022.01)
*G06V 10/26*    (2022.01)
(Continued)

(52) U.S. Cl.
CPC .............. *G06V 20/52* (2022.01); *G06V 10/26* (2022.01); *G06V 10/454* (2022.01); *G06V 10/764* (2022.01); *G06V 10/82* (2022.01)

(58) Field of Classification Search
CPC ...... G06V 10/26; G06V 10/82; G06V 10/454; G06V 10/764; G06V 20/52;
(Continued)

(56) References Cited

U.S. PATENT DOCUMENTS 6,081,606 A   6/2000 Hansen et al.
9,013,294 B1  4/2015 Trundle
(Continued)

OTHER PUBLICATIONS

Ballan, L., et al.: Knowledge transfer for scenespecific motion prediction. In: European Conference on Computer Vision (ECCV). (2016).
(Continued)

*Primary Examiner* — Daniel G Mariam
(74) *Attorney, Agent, or Firm* — Ballard Spahr LLP

(57) ABSTRACT

A camera system may automatically identify high frequency motion regions in a field of view of the camera system. Analysis of motion events detected at different regions of a scene in the field of view, may be performed. Similar events frequently occurring at a certain region may be recorded/accumulated and compared to a threshold. Regions with high frequency activity may be determined and a user may be notified. If the user is not interested in events within the high activity regions, the regions may be ignored and notifications to the user may cease. The camera system may determine specific actions/events occurring in a region, such as a person approaching or leaving a home.

30 Claims, 19 Drawing Sheets

Related U.S. Application Data continuation of application No. 16/353,954, filed on Mar. 14, 2019, now Pat. No. 11,295,140.

(60) Provisional application No. 62/643,093, filed on Mar. 14, 2018.

(51) Int. Cl.
*G06V 10/44* (2022.01)
*G06V 10/764* (2022.01)
*G06V 10/82* (2022.01)

(58) Field of Classification Search
CPC . G06T 2207/10016; G06T 2207/30232; G06T 7/20
See application file for complete search history.

(56) References Cited

U.S. PATENT DOCUMENTS

| | | |
|---|---|---|
| 9,626,849 B2 | 4/2017 | Dixon et al. |
| 2003/0025599 A1 | 2/2003 | Monroe |
| 2008/0048870 A1 | 2/2008 | Laitta et al. |
| 2009/0195401 A1 | 8/2009 | Maroney et al. |
| 2013/0182107 A1 | 7/2013 | Anderson |
| 2016/0042621 A1 | 2/2016 | Hogg et al. |
| 2017/0185849 A1 | 6/2017 | High et al. |

OTHER PUBLICATIONS

Ballan, L.,et al: A data-driven approach for tag refinement and localization in web videos. Computer Vision and Image Understanding 140 (Nov. 2015) 58-67.
Caba Heilbron, F., et al.: Activitynet: A large-scale video benchmark for human activity understanding. In: The IEEE Conference on Computer Vision and Pattern Recognition (CVPR). (Jun. 2015).
Collins, R., et al .: A system for video surveillance and monitoring. Technical Report CMU-RI-TR-00-12, Carnegie Mellon University, Pittsburgh, PA (May 2000).
Donahue, J., et al.: Long-term recurrent convolutional networks for visual recognition and description. In: CVPR, IEEE Computer Society (2015) 2625-2634.
Donahue, J.,et al.: Decaf: A deep convolutional activation feature for generic visual recognition. In Xing, E.P., Jebara, T., eds.: Proceedings of the 31st International Conference on Machine Learning. vol. 32 of Proceedings of Machine Learning Research., Bejing, China, PMLR (Jun. 22-24, 2014) 647-655.
Feichtenhofer, C., et al.: Convolutional two-stream network fusion for video action recognition. In: 2016 IEEE Conference on Computer Vision and Pattern Recognition, CVPR 2016, Las Vegas, NV, USA, Jun. 27-30, 2016. (2016) 1933-1941.
Fusier, F., et al.: Video understanding for complex activity recognition. Machine Vision and Applications 18(3)(Aug. 2007) 167-188.
Grauman, K., et al.: The pyramid match kernel: Discriminative classification with sets of image features. In: IN ICCV. (2005) 1458-1465.
Haritaoglu, I.,et al.: W4: Real-time surveillance of people and their activities. IEEE Transactions on Pattern Analysis and Machine Intelligence 22 (2000) 809-830.
Hasan, M., et al.: Learning temporal regularity in video sequences. In: The IEEE Conference on Computer Vision and Pattern Recognition (CVPR). (Jun. 2016).
Hays, J., et al.: Scene completion using millions of photographs. ACM Trans. Graph. 26(3) (Jul. 2007).
He, K., et al.: Spatial pyramid pooling in deep convolutional networks for visual recognition. In Fleet, D., Pajdla, T., Schiele, B., Tuytelaars, T., eds.: Computer Vision—ECCV 2014, Cham, Springer International Publishing (2014) 346-361.
Ji, S., et al.: 3d convolutional neural networks for human action recognition. IEEE Trans. Pattern Anal. Mach. Intell. 35 (1) (Jan. 2013) 221-231.
Kay, W., et al..: The kinetics human action video dataset. CoRR abs/1705.06950 (2017).
Kingma, D.P., et al: A method for stochastic optimization. In: International Conference on Learning Representations (ICLR). (2015).
Kitani, K.M., et al.: Activity forecasting. In: Proceedings of the 12th European Conference on Computer Vision—vol. Part IV. ECCV'12, Berlin, Heidelberg, Springer-Verlag (2012) 201-214.
Kuhne, H., et al.: Hmdb: A large video database for human motion recognition. In: IEEE International Conference on Computer Vision (ICCV). (2011).
Lazebnik, S., et al.: Beyond bags of features: Spatial pyramid matching for recognizing natural scene categories. In: Proceedings of the 2006 IEEE Computer Society Conference on Computer Vision and Pattern Recognition—vol. 2. CVPR '06, Washington, DC, USA, IEEE Computer Society (2006) 2169-2178.
Li, A., et al.: Selective encoding for recognizing unreliably localized faces. In: 2015 IEEE International Conference on Computer Vision, ICCV 2015, Santiago, Chile, Dec. 7-13, 2015. (2015) 3613-3621.
Li, L.J., et al..: Object bank: An object-level image representation for high-level visual recognition. Int. J. Comput. Vision 107(1) (Mar. 2014) 20-39.
Liu, C., et al. In: Nonparametric Scene Parsing via Label Transfer. Springer International Publishing, Cham (2016) 207-236.
Lowe, D.G.: Distinctive image features from scale-invariant keypoints. International Journal of Computer Vision 60 (2004) 91-110.
Ma, C., et al.: TS-LSTM and temporal-inception: Exploiting spatiotemporal dynamics for activity recognition. CoRR abs/1703.10667 (2017).
Ng, J.Y.H., et al.: Beyond short snippets: Deep networks for video classification. In: CVPR, IEEE Computer Society (2015) 4694-4702.
Perronnin, F., et al.: Improving the fisher kernel for large-scale image classification. In: Proceedings of the 11th European Conference on Computer Vision: Part IV. ECCV'10, Berlin, Heidelberg, Springer-Verlag (2010) 143-156.
Sadanand, et al.: Action bank: A high-level representation of activity in video. In: Proceedings of IEEE Conference on Computer Vision and Pattern Recognition. (2012).
Simonyan, K., et al.: Two-stream convolutional networks for action recognition in videos. In: Proceedings of the 27th International Conference on Neural Information Processing Systems—vol. 1. NIPS'14, Cambridge, MA, USA, MIT Press (2014) 568-576.
Singh, S., et al.: Unsupervised discovery of mid-level discriminative patches. Computer Vision—ECCV 2012, Berlin, Heidelberg, Springer Berlin Heidelberg (2012) 73-86.
Sivic, J.,et al.: Video Google: A text retrieval approach to object matching in videos. In: Proceedings of the International Conference on Computer Vision. vol. 2. (Oct. 2003) 1470-1477.
Soomro, K.,et al.: Ucf101: A dataset of 101 human actions classes from videos in the wild. CoRR abs/1212.0402 (2012).
Taylor, G.W., et al.: Convolutional learning of spatio-temporal features. In: Proceedings of the 11th European Conference on Computer Vision: Part VI. ECCV'10, Berlin, Heidelberg, Springer-Verlag (2010) 140-153.
Tighe, J., et al.: Superparsing: Scalable nonparametric image parsing with superpixels. In Daniilidis, K., Maragos, P., Paragios, N., eds.: Computer Vision—ECCV 2010,Berlin, Heidelberg, Springer Berlin Heidelberg (2010) 352-365.
Tran, D., et al.: Learning spatiotemporal features with 3d convolutional networks. In: IEEE International Conference on Computer Vision (ICCV). (2015).
Van de Sande, K.E.A., et al.: Segmentation as Selective Search for Object Recognition. In: ICCV. (2011).
Wang, J., et al.: Locality-constrained linear coding for image classification. In: IN: IEEE Conference on Computer Vision and Pattern Classificatoin. (2010).
Wang, L., et al..: Temporal segment networks: Towards good practices for deep action recognition. In: ECCV. (2016).
Xu, C., et al.: Actor-action semantic segmentation with grouping-process models. In: Proceedings of IEEE Conference on Computer Vision and Pattern Recognition. (2016).
Xu, D., et al.: Learning deep representations of appearance and motion for anomalous event detection. In Xianghua Xie, M.W.J.,

(56) References Cited

OTHER PUBLICATIONS

Tam, G.K.L., eds.: Proceedings of the British Machine Vision Conference (BMVC), BMVA Press (Sep. 2015) 8.1-8.12.
Xu, X., et al.: Discovery of shared semantic spaces for multiscene video query and summarization. IEEE Transactions on Circuits and Systems for Video Technology 27(6) (2017) 1353-1367.
Yang, J., et al.: Linear spatial pyramid matching using sparse coding for image classification. In: in IEEE Conference on Computer Vision and Pattern Recognition( CVPR. (2009).
Yu, R., et al: Remotenet: Efficient relevant motion event detection for largescale home surveillance videos. In: IEEE Winter Conf. on Applications of Computer Vision (WACV). (2018).
Yuen, J., et al.: A data-driven approach for event prediction. In Daniilidis, K., Maragos, P., Paragios, N., eds.: Computer Vision—ECCV 2010, Berlin, Heidelberg, Springer Berlin Heidelberg (2010) 707-720.
Zhao, R.,et al.: Learning semantic feature map for visual content recognition. In: Proceedings of the 2017 ACM on Multimedia Conference, MM 2017, Mountain View, CA, USA, Oct. 23-27, 2017. (2017) 1291-1299.
Zhou, S., et al.: Spatial-temporal convolutional neural networks for anomaly detection and localization in crowded scenes. Image Commun. 47(C) (Sep. 2016) 358-368.

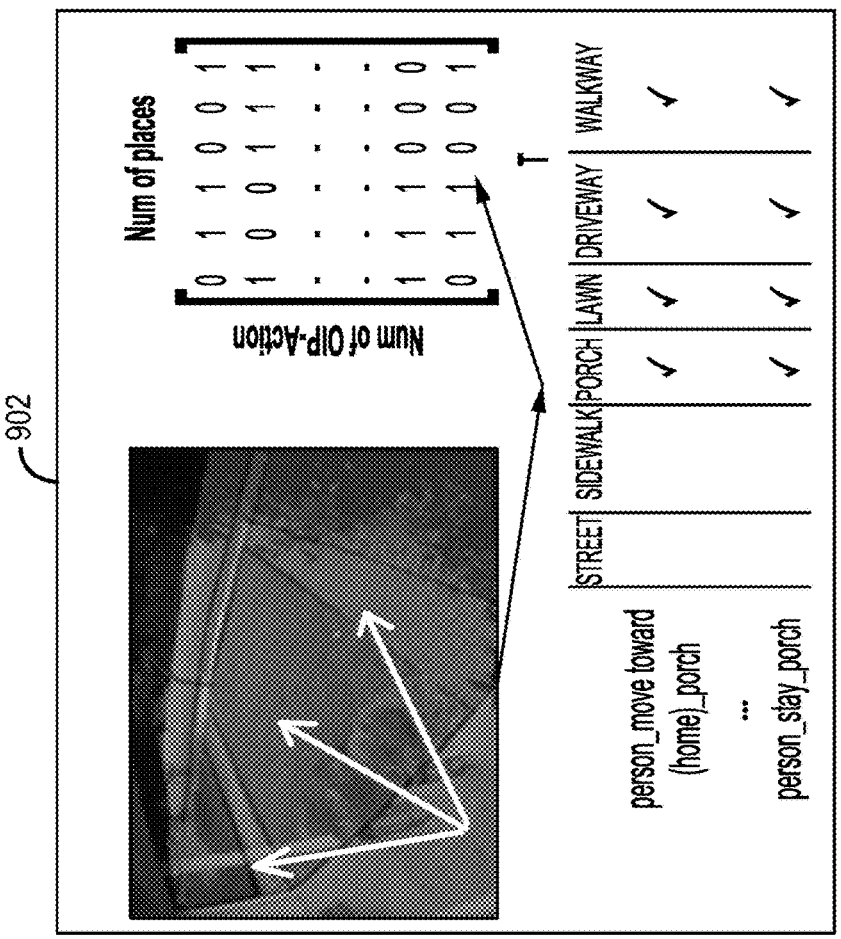
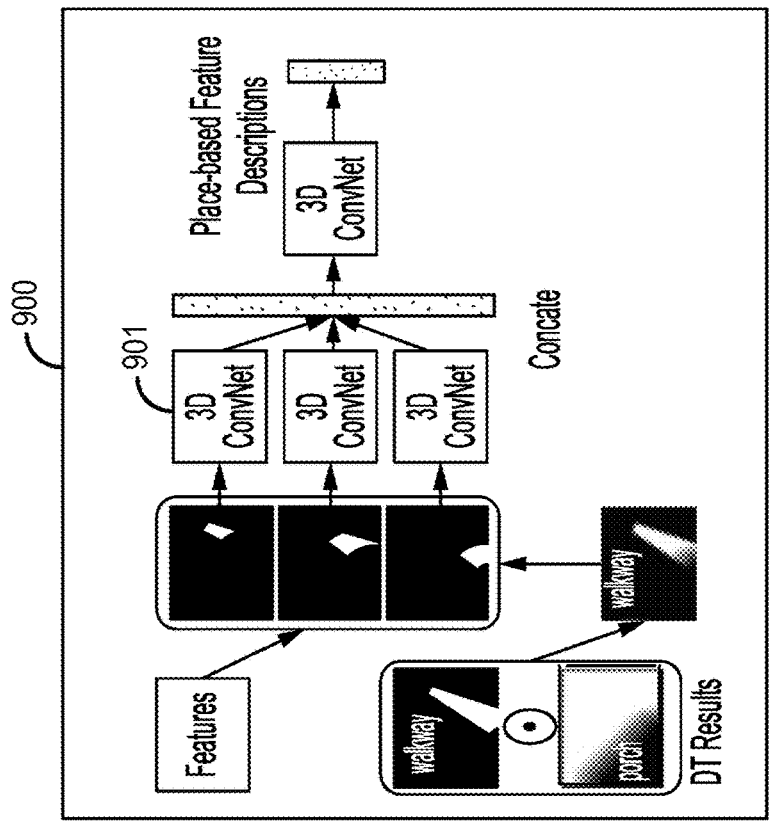
FIG. 9

METHODS AND SYSTEMS FOR DETERMINING OBJECT ACTIVITY WITHIN A REGION OF INTEREST

CROSS REFERENCE TO RELATED APPLICATIONS

This application is a continuation of U.S. patent application Ser. No. 17/691,695, filed Mar. 10, 2022, which is a continuation of U.S. patent application Ser. No. 16/353,954, filed Mar. 14, 2019, now U.S. Pat. No. 11,295,140, issued Apr. 5, 2022, which claims priority to U.S. Provisional Application No. 62/643,093 filed Mar. 14, 2018, all of which are herein incorporated by reference in their entirety.

BACKGROUND

A camera, such as a camera used for surveillance and/or security, may capture an activity occurring within its field of view and provide a user with a notification of the activity. However, if the camera is placed in a high traffic area, such as a road or street, the camera will capture an excessive amount of activity occurring within its field of view. The camera will notify the user of the excessive amount of activity, even though the user may not be interested in some or any of the activity. The camera is unable to determine a region(s) within its field of view that may or may not be of interest to the user and notify the user of a specific object and/or specific type of activity associated with the object occurring within the region(s), such as a person/animal walking towards/from the user's private property, vehicles passing by on a road in front of a home, flags/windmills in motion due to heavy wind, etc. These and other considerations are addressed by the methods and systems described herein.

SUMMARY

It is to be understood that both the following general description and the following detailed description are explanatory only and are not restrictive. Methods and systems are described for determining object activity within a region of interest. A camera system (e.g., a smart camera, a camera in communication with a computing device, etc.) may identify/detect high frequency activity/motion regions within its field of view. The camera system may be used for long-term analysis of activity/motion events detected at different regions of a scene within its field of view, such as a user's front porch, private property, and the like, over an extended time period (e.g., hours, days, etc.). The camera system may capture/detect similar activity/motion events frequently occurring within a certain region and record (e.g., store, accumulate, etc.) statistics associated with each activity/motion event. Regions within the field of view of the camera system with high frequency activity/motion may be identified/determined and a user may be notified. The camera system may identify/detect regions within its field of view, objects within the regions, actions/motions associated with the objects, or the like. Regions (images of the regions, etc.) within field of view of the camera system may be tagged with region-labels that identify the regions, such as, "street," "sidewalk," "private walkway," "private driveway," "private lawn," "private porch," and the like. The camera system may determine the regions within its field of view and the information may be used to train the camera system and/or a neural network associated with the camera system to automatically detect/determine regions within its field of view.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, and together with the description, serve to explain the principles of the methods and systems:

FIG. 9 shows distance-based place discretization and topological feature aggregation;

DETAILED DESCRIPTION

Figure 1:
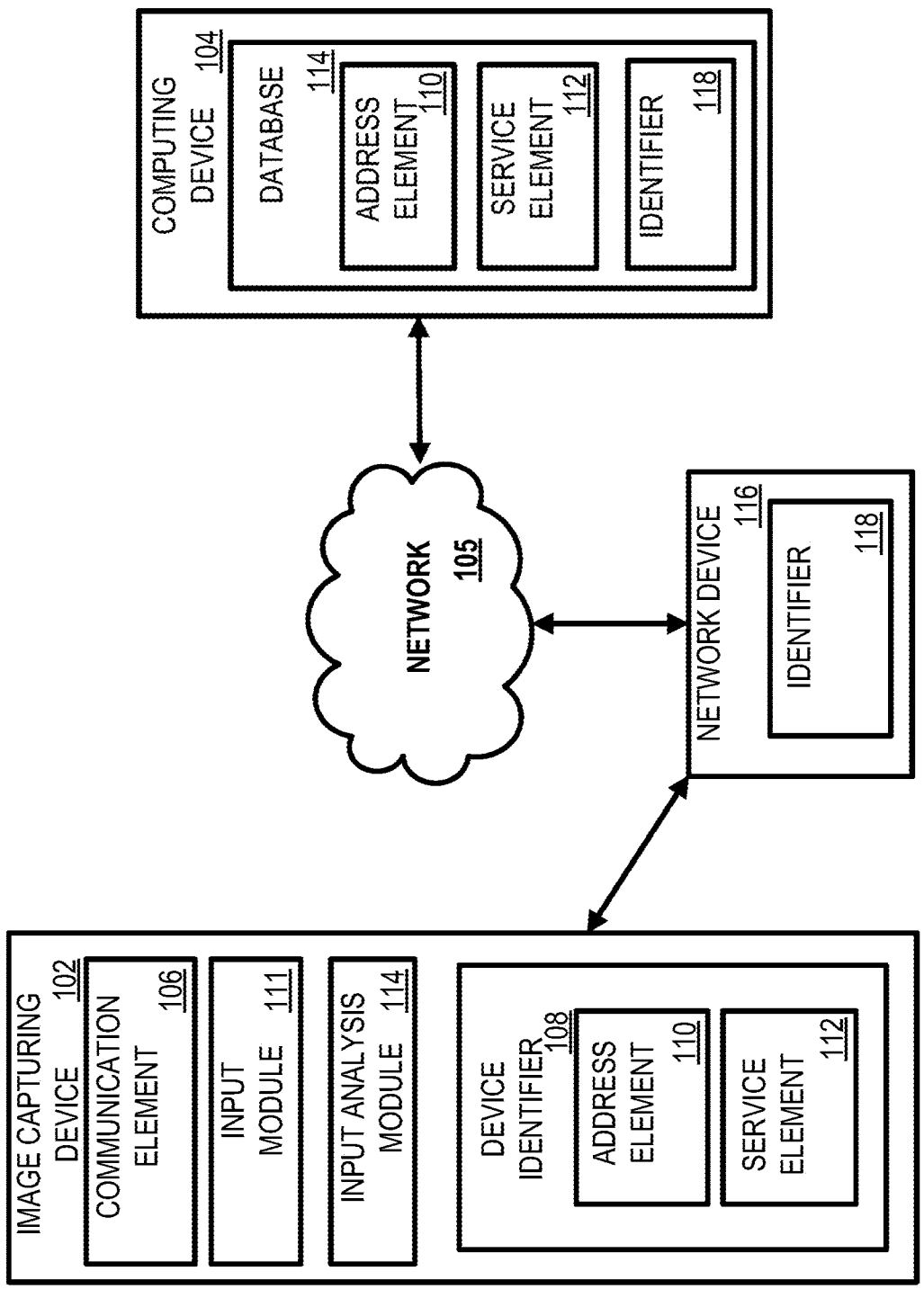
FIG. 1 shows an environment in which the present methods and systems may operate.

Before the present methods and systems are described, it is to be understood that the methods and systems are not limited to specific methods, specific components, or to particular implementations. It is also to be understood that the terminology used herein is for the purpose of describing particular features only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another range includes from the one particular value and/or to the other particular value. Similarly, when values are expressed as approximations, by use of the antecedent "about," it will be understood that the particular value forms another value. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Such as" is not used in a restrictive sense, but for explanatory purposes.

Components that may be used to perform the present methods and systems are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all sections of this application including, but not limited to, steps in described methods. Thus, if there are a variety of additional steps that may be performed it is understood that each of these additional steps may be performed with any specific step or combination of steps of the described methods.

As will be appreciated by one skilled in the art, the methods and systems may be implemented using entirely hardware, entirely software, or a combination of software and hardware. Furthermore, the methods and systems may take the form of a computer program product on a computer-readable storage medium having computer-readable program instructions (e.g., computer software) encoded on the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described below with reference to block diagrams and flowchart illustrations of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

Note that in various cases described herein reference may be made to a given entity performing some action. It should be understood that this language may in some cases mean that a system (e.g., a computer) owned and/or controlled by the given entity is actually performing the action.

Methods and systems are described for determining activity within a region of interest. A camera (e.g., video camera, etc.) system (e.g., a camera in communication with a computing device) may identify/detect high frequency activity/motion regions within its field of view. The camera system may capture video of a scene within its field of view. For each frame of the video, a change in pixels from a previous frame may be determined. If a change in a pixel (e.g., one or more pixels, etc.) is determined, the frame may be tagged with a motion indication parameter with a predefined value (e.g., 1) at the location in the frame where the change of pixel occurred. If it is determined that no pixels changed (e.g., one or more pixels, etc.), the frame may be tagged with a motion indication parameter with a different predefined value (e.g., 0). A plurality of frames associated with the video may be determined and a plurality of motion indication parameters may be determined and/or stored. A plurality of frames associated with the video may be determined and a plurality of motion indication parameters may be determined and/or stored over a time period (e.g., a day(s), a week(s), etc.). The plurality of motion indication parameters may be compared to a threshold. An amount of motion indication parameters with a value of 1 may satisfy or exceed a threshold value, such as 100 motion indication parameters with a value of 1 may exceed a threshold value set for motion indication parameters with a value of 1. A threshold value may be based on any amount or value of motion indication parameters. A region of interest (ROI) within the field of view of the camera may be determined based on the plurality of motion indication parameters compared to a threshold.

The camera system may be used for long-term analysis of activity/motion events detected at different regions of a scene within its field of view, such as a user's front porch, private property, and the like, over an extended time period (e.g., hours, days, etc.). The camera system may capture/detect similar activity/motion events frequently occurring within a certain region and record (e.g., store, accumulate, etc.) statistics associated with each activity/motion event. Regions within the field of view of the camera system with high frequency activity/motion may be identified/determined and a user may be notified. A notification may be sent to the user that requests the user confirm whether the user desires continued notification of a particular region and/or frequently occurring activity/motion event. A user may be notified that a region within the field of view of the camera is associated with a plurality of motion indication parameters that satisfy, do not satisfy, or exceed a threshold value. The camera system may notify the user (e.g., a user device, etc.) via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification. A user may receive a message via a user device such as "do you want to ignore the event and/or events in this area?" "do you want to be notified of events on the road?" or any other type of message. If the user does not desire continued notification of the particular region and/or the frequently occurring activity/motion event, the camera may cease such notifications and/or filter/cease detection of the particular region and/or the frequently occurring activity/motion event.

The camera system may identify/detect regions within its field of view, objects within the regions, actions/motions associated with the objects, or the like. The camera system may determine regions within its field of view and images of the regions may be tagged with region-labels that identify the regions. images of the regions may be tagged with labels such as, "street," "sidewalk," "private walkway," "private driveway," "private lawn," "private porch," and the like. The camera system may determine the regions within its field of view based on user provided information. The user may use an interface in communication with and/or associated with the camera system that displays the camera system's field of view to identify (e.g., draw, click, circle, etc.) the regions.

The camera system may determine the regions within its field of view by automatically identifying/detecting the regions and sending notifications to the user when a motion event is detected in an automatically identified/detected region or regions. The user may use the interface in communication with and/or associated with the camera system to view the notifications and to provide feedback indications (e.g., a "Thumbs Up" button indicative of a notification being helpful; a "Thumbs Down" button indicative of a notification being unhelpful, and the like). The feedback indications may be sent through the interface to the camera system. Based on the feedback indications provided from the user after viewing a notification(s), the camera system may continue or may cease providing notifications for the region or regions associated with the notification(s). The camera system may continue providing notifications for the region or regions associated with the notification(s) when the feedback indicates the notification(s) are helpful or desirable (e.g., an indication of a "Thumbs Up" in response to viewing the notification(s); an indication that the notification(s) was viewed at least once; and the like). The camera system may cease providing notifications for the region or regions associated with the notification(s) when the feedback indicates the notification(s) are not helpful or not desirable (e.g., an indication of a "Thumbs Down" in response to viewing the notification(s); an indication that the notification(s) was not viewed; and the like).

A region segmentation map may be generated, based on the identified/detected regions. One or more region segmentation maps and associated information may be used to train the camera system and/or any other camera system (e.g., a camera-based neural network, etc.) to automatically identify/detect regions of interest (ROIs) within a field of view. The camera system may automatically determine that a region within its field of view is a home/porch and whether an object moves towards the home/porch. The camera system may only be concerned (e.g., perform identification/detection, etc.) with region(s) within its field of view determined to be a particular region(s). The camera system may only be concerned with a region within its field of view determined to be a porch or regions connected to and/or associated with the porch, such as a lawn, a walkway, or the like. The camera system may only be concerned (e.g., perform identification/detection, etc.) with a particular region within its field of view to reduce analysis of unnecessary information (e.g., actions, motions, objects, etc.) of other regions within its field of view. The camera system may be configured to detect a particular object and/or action/motion occurring in the particular region within its field of view, such as a person walking towards the front door of a house. The camera system may be configured to ignore (e.g., not detect, etc.) a particular object and/or action/motion occurring in the particular region within its field of view, such as a person walking along a sidewalk. The camera system may use scene recognition to automatically identify regions, objects, and actions/motions occurring in a scene with in its field of view that may be a layout that is new to the camera system (e.g., the front yard of a location where the camera of the camera system is newly installed, etc.). The camera system (or any other camera system, etc.) may abstract away appearance variations between scenes within its field of view (e.g., variations in scenes caused by a change in a location of the camera system).

To abstract away appearance variations between scenes within its field of view, the camera system may use a layout-induced video representation (LIVR) method to encode a scene layout based on a region segmentation map determined from a previous scene in the camera system's field of view.

FIG. 1 shows an environment in which the present methods and systems may operate. The present disclosure is relevant to systems and methods for determining object activity within a region of interest. The network and system may be an image capturing device 102 in communication with a computing device 104 such as a server. The computing device 104 may be disposed locally or remotely relative to the image capturing device 102. The image capturing device 102 and the computing device 104 may be in communication via a private and/or public network 105 such as the Internet or a local area network. Other forms of communications may be used such as wired and wireless telecommunication channels.

The image capturing device 102 may be an electronic device such as a smart camera, a video recording and analysis device, a communications terminal, a computer, a display device, or other device capable of capturing images, video, and/or audio and communicating with the computing device 104. The image capturing device 102 may be a communication element 106 for providing an interface to a user to interact with the image capturing device 102 and/or the computing device 104. The communication element 106 may be any interface for presenting and/or receiving information to/from the user, such as a notification, confirmation, or the like associated with a region of interest (ROI), an object, or an action/motion within a field of view of the image capturing device 102. An interface may be a communication interface such as a display screen, a touchscreen, an application interface, a web browser (e.g., Internet Explorer®, Mozilla Firefox®, Google Chrome®, Safari®, or the like). Other software, hardware, and/or interfaces may be used to provide communication between the user and one or more of the image capturing device 102 and the computing device 104. The communication element 106 may request or query various files from a local source and/or a remote source. The communication element 106 may send data to a local or remote device such as the computing device 104.

The image capturing device 102 may be associated with a device identifier 108. The device identifier 108 may be any identifier, token, character, string, or the like, for differentiating one image capturing device (e.g., image capturing device 102) from another image capturing device. The device identifier 108 may identify an image capturing device as belonging to a particular class of image capturing devices. The device identifier 108 may be information relating to an image capturing device such as a manufacturer, a model or type of device, a service provider associated with the image capturing device 102, a state of the image capturing device 102, a locator, and/or a label or classifier. Other information may be represented by the device identifier 108.

The device identifier 108 may be an address element 110 and a service element 112. The address element 110 may be or provide an internet protocol address, a network address, a media access control (MAC) address, an Internet address, or the like. The address element 110 may be relied upon to establish a communication session between the image capturing device 102 and the computing device 104 or other devices and/or networks. The address element 110 may be used as an identifier or locator of the image capturing device 102. The address element 110 may be persistent for a particular network.

The service element 112 may be an identification of a service provider associated with the image capturing device 102 and/or with the class of image capturing device 102. The class of the user device 102 may be related to a type of device, capability of device, type of service being provided, and/or a level of service (e.g., business class, service tier, service package, etc.). The service element 112 may be information relating to or provided by a communication service provider (e.g., Internet service provider) that is providing or enabling data flow such as communication services to the image capturing device 102. The service element 112 may be information relating to a preferred service provider for one or more particular services relating to the image capturing device 102. The address element 110 may be used to identify or retrieve data from the service element 112, or vice versa. One or more of the address element 110 and the service element 112 may be stored remotely from the image capturing device 102 and retrieved by one or more devices such as the image capturing device 102 and the computing device 104. Other information may be represented by the service element 112.

The computing device 104 may be a server for communicating with the image capturing device 102. The computing device 104 may communicate with the user device 102 for providing data and/or services. The computing device 104 may provide services such as object activity and region detection services. The computing device 104 may allow the image capturing device 102 to interact with remote resources such as data, devices, and files.

The computing device 104 may manage the communication between the image capturing device 102 and a database 114 for sending and receiving data therebetween. The database 114 may store a plurality of files (e.g., regions of interest, motion indication parameters, etc.), object and/or action/motion detection algorithms, or any other information. The image capturing device 102 may request and/or retrieve a file from the database 114. The database 114 may store information relating to the image capturing device 102 such as the address element 110, the service element 112, regions of interest, motion indication parameters, and the like. The computing device 104 may obtain the device identifier 108 from the image capturing device 102 and retrieve information from the database 114 such as the address element 110 and/or the service elements 112. The computing device 104 may obtain the address element 110 from the image capturing device 102 and may retrieve the service element 112 from the database 114, or vice versa. The computing device 104 may obtain the regions of interest, motion indication parameters, object and/or action/motion detection algorithms, or the like from the image capturing device 102 and retrieve/store information from the database 114, or vice versa. Any information may be stored in and retrieved from the database 114. The database 114 may be disposed remotely from the computing device 104 and accessed via direct or indirect connection. The database 114 may be integrated with the computing system 104 or some other device or system.

A network device 116 may be in communication with a network such as network 105. One or more of the network devices 116 may facilitate the connection of a device, such as image capturing device 102, to the network 105. The network device 116 may be configured as a wireless access point (WAP). The network device 116 may be configured to allow one or more wireless devices to connect to a wired and/or wireless network using Wi-Fi, BLUETOOTH®, or any desired method or standard.

The network device 116 may be configured as a local area network (LAN). The network device 116 may be a dual band wireless access point. The network device 116 may be configured with a first service set identifier (SSID) (e.g., associated with a user network or private network) to function as a local network for a particular user or users. The network device 116 may be configured with a second service set identifier (SSID) (e.g., associated with a public/community network or a hidden network) to function as a secondary network or redundant network for connected communication devices.

The network device 116 may have an identifier 118. The identifier 118 may be or relate to an Internet Protocol (IP) Address IPV4/IPV6 or a media access control address (MAC address) or the like. The identifier 118 may be a unique identifier for facilitating communications on the physical network segment. There may be one or more network devices 116. Each of the network devices 116 may have a distinct identifier 118. An identifier (e.g., the identifier 118) may be associated with a physical location of the network device 116.

The image capturing device 102 may have an input module 111. The input module 111 may be one or more cameras (e.g., video cameras) and/or microphones that may be used to capture one or more images (e.g., video, etc.) and/or audio of a scene within its field of view.

The image capturing device 102 may have an image analysis module 114. The image analysis module 114 may analyze one or more images (e.g., video, frames of video, etc.) determined/captured by the image capturing device 102 and determine a plurality of portions of a scene within a field of view of the image capturing device 102 (e.g., the input module 111). Each portion of the plurality of portions of the scene may be classified/designated as a region of interest (ROI). A plurality of ROIs associated with a scene may be used to generate a region segmentation map of the scene. The image analysis module 114 may use a region segmentation map as baseline and/or general information for predicting/determining a plurality of portions (e.g., a street, a porch, a lawn, etc.) of a new scene in a field of view of the image capturing device 102.

The image analysis module 114 may use selected and/or user provided information/data associated with one or more scenes to automatically determine a plurality of portions of any scene within a field of view of the image capturing device 102. The selected and/or user provided information/data may be provided to the image capturing device 102 during a training/registration procedure. A user may provide general geometric and/or topological information/data (e.g., user defined regions of interest, user defined geometric and/or topological labels associated with one or more scenes such as "street, "porch, "lawn," etc.) to the image capturing device 102. The communication element 106 may display a scene in the field of view of the image capturing device 102 (e.g., the input module 111). The user may use the communication element 106 (e.g., an interface, a touchscreen, a keyboard, a mouse, etc.) to generate/provide the geometric and/or topological information/data to the image analysis module 114. The user may use an interface to identify (e.g., draw, click, circle, etc.) regions of interests (ROIs) within a scene. The user may tag the ROIs with labels such as, "street," "sidewalk," "private walkway," "private driveway," "private lawn," "private porch," and the like. A region segmentation map may be generated, based on the user defined ROIs. One or more region segmentation maps may be used to train the image analysis module 114 and/or any other camera system (e.g., a camera-based neural network, etc.) to automatically identify/detect regions of interest (ROIs) within a field of view. The image analysis module 114 may use the general geometric and/or topological information/data (e.g., one or more region segmentation maps, etc.) as template and/or general information to predict/determine portions and/or regions of interest (e.g., a street, a porch, a lawn, etc.) associated with any scene (e.g., a new scene) in a field of view of the image capturing device 102.

The image analysis module 114 may determine an area within its field of view to be a region of interest (ROI) (e.g., a region of interest to a user) and/or areas within its field of view that are not regions of interest (e.g., non-ROIs). The image analysis module 114 may determine an area within its field of view to be a ROI or non-ROI based on long-term analysis of events occurring within its field of view. The image analysis module 114 may determine/detect a motion event occurring within an area within its field of view and/or a determined region of interest (ROI), such as a person walking towards a front door of a house within the field of view of the image capturing device 102. The image analysis module 114 may analyze video captured by the input module 111 (e.g., video captured over a period of time, etc.) and determine whether a plurality of pixels associated with a frame of the video is different from a corresponding plurality of pixels associated with a previous frame of the video. The image analysis module 114 may tag the frame with a motion indication parameter based on the determination whether the plurality of pixels associated with the frame is different from a corresponding plurality of pixels associated with a previous frame of the video. If a change in the plurality of pixels associated with the frame is determined, the frame may be tagged with a motion indication parameter with a predefined value (e.g., 1) at the location in the frame where the change of pixel occurred. If it is determined that no pixels changed (e.g., the pixel and its corresponding pixel is the same, etc.), the frame may be tagged with a motion indication parameter with a different predefined value (e.g., 0). A plurality of frames associated with the video may be determined. The image analysis module 114 may determine and/or store a plurality of motion indication parameters.

The image analysis module 114 may determine and/or store a plurality of motion indication parameters over a time period (e.g., a day(s), a week(s), etc.). The plurality of motion indication parameters may be compared to a threshold. An amount of motion indication parameters with a value of 1 may satisfy or exceed a threshold value. The threshold value may be based on any amount or value of motion indication parameters. (e.g., 100 motion indication parameters with a value of 1 may exceed a threshold value set for 50 motion indication parameters with a value of 1).

The image analysis module 114 may perform analysis of activity/motion events detected at different ROIs of a scene, such as a user's front porch, private property, and the like, over an extended time period (e.g., hours, days, etc.). During such extended activity/motion analysis, the image analysis module 114 may determine similar activity/motion events frequently occurring within a particular ROI and record (e.g., store, accumulate, etc.) statistics associated with each activity/motion event. Regions of interest (ROIs) within the field of view of the image capturing device 102 with high frequency activity/motion may be identified/determined and a user may be notified. A notification may be sent to the user (e.g., to a user device) that requests that the user confirms whether the user would like to continue to receive notifications of activity/motion occurring within a particular ROI.

The image analysis module 114 may be trained to continue or to cease providing a notification when an activity/motion event is detected in a ROI based on user provided feedback indications. The user may provide the feedback using an interface of a user device (e.g., a "Thumbs Up" button indicative of a notification being helpful; a "Thumbs Down" button indicative of a notification being unhelpful, and the like). The feedback may be sent by the user device to the analysis module 114. Based on the feedback provided from the user after viewing a notification, the camera system may continue or may cease providing notifications for the ROI associated with the notification. The camera system may continue providing notifications for the ROI associated with the notification when the feedback indicates the notification is helpful or desirable (e.g., an indication of a "Thumbs Up" in response to viewing the notification; an indication that the notification was viewed at least once; and the like). The camera system may cease providing notifications for the ROI associated with the notification when the feedback indicates the notification is not helpful or not desirable (e.g., an indication of a "Thumbs Down" in response to viewing the notification; an indication that the notification was not viewed; and the like).

The image capturing device 102 may use the communication element 106 to notify the user of activity/motion occurring within a particular ROI. The notification may be sent to the user via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification. A user may receive a message, via a user device, such as "Are you interested in the events in the region in the future?", "do you want to be notified of events on the road?", or any other type of message. If the user does not desire continued notification of activity/motion occurring within a particular ROI, the image capturing device 102 may cease such notifications and/or filter/cease detection of activity/motion occurring within the particular ROI. By filtering/ceasing detection of activity/ motion occurring within a particular ROI, the image capturing device 102 may avoid/reduce notifications of action/motion events, such as trees/flags moving due to wind, rain/snow, shadows, and the like that may not be of interest to the user.

Figure 2:
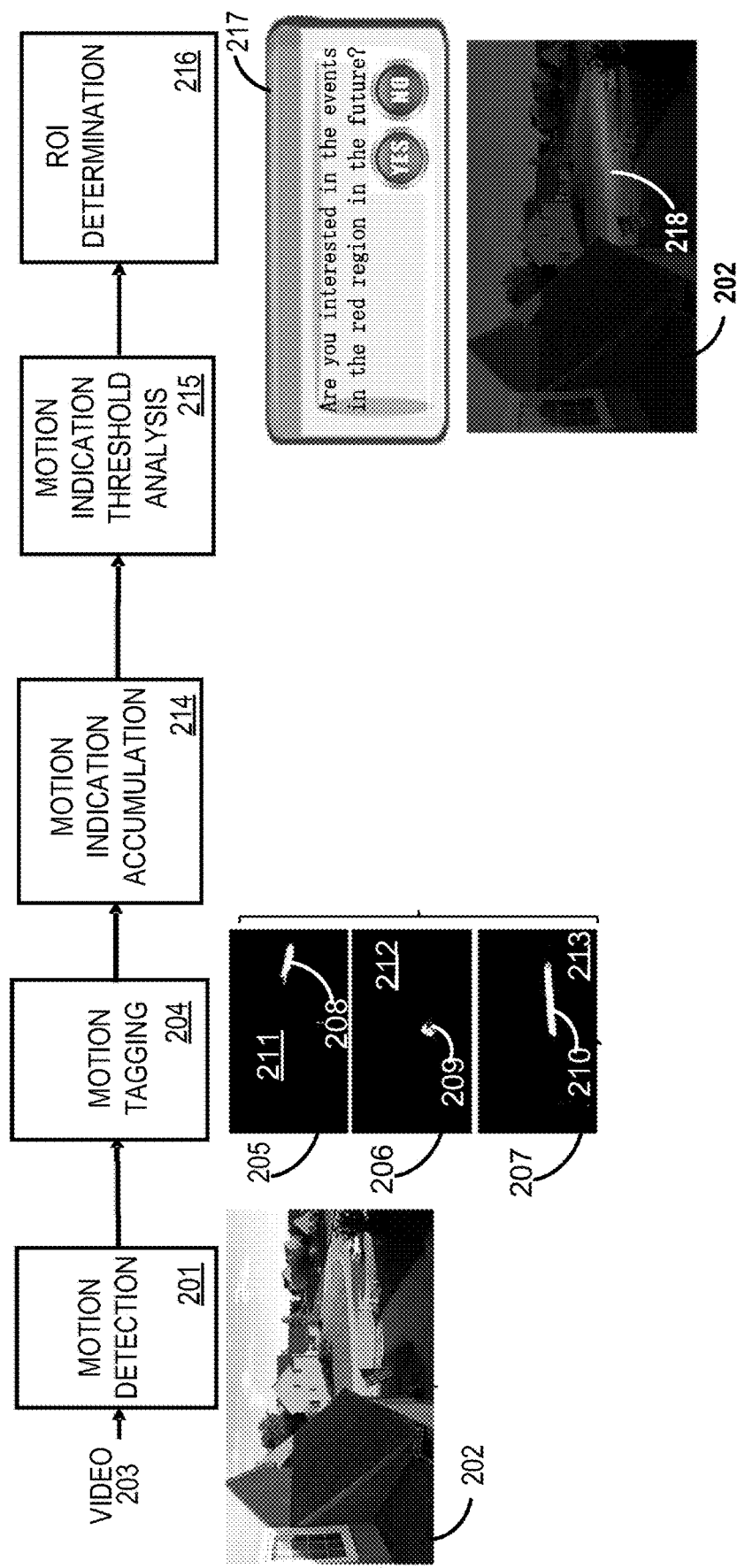
FIG. 2 shows a process flowchart of an image capturing device determining an area within a field of view to be a region of interest (ROI)

FIG. 2 is a process flowchart detailing how an image capturing device (e.g., the image capturing device 102, etc.) may determine an area within its field of view to be a region of interest (ROI) or a non-region of interest (non-ROI) based on long-term analysis of events occurring within its field of view. The image capturing device may determine an area within its field of view to be a ROI or a non-ROI and provide a notification to a user.

At 201, the image capturing device may determine/detect a motion event occurring within an area within its field of view 202. The image capturing device may be one or more cameras (e.g., video cameras) and/or microphones that may be used to capture video 203 and/or audio of a scene within its field of view 202. The motion event may be a car driving in front door of a house within the field of view 202 of the image capturing device. The motion event may be any type of motion occurring within the field of view 202. The image capturing device may analyze the video 203 and determine whether a plurality of pixels associated with a frame of the video 203 is different from a corresponding plurality of pixels associated with a previous frame of the video 203.

At 204, the image capturing device (e.g., the image capturing device 102, etc.) may tag one or more frames 205, 206, 207 with a motion indication parameter based on the determination whether the plurality of pixels associated with the one or more frames 205, 206, 207 are different from a corresponding plurality of pixels associated with a previous frame of the video 203. The image capturing device may analyze the video 203 and determine whether a plurality of pixels associated with one or more frames 205, 206, 207 of the video 203 is different from a corresponding plurality of pixels associated with a previous frame of the video 203. The image capturing device may analyze the video 203 and determine whether a plurality of pixels associated with a frame 206 is different from a corresponding plurality of pixels associated with a previous frame 205. The image capturing device may analyze the video 203 and determine whether a plurality of pixels associated with any frames of the video 203 is different from a corresponding plurality of pixels associated with a previous frame of the video 203. The image capturing device may determine that one or more pixels of the plurality of pixels associated with the one or more frames 205, 206, 207 changes (e.g., is different, etc.) in reference to a previous frame, and a respective area of each of the one or more frames 205, 206, 207 may be tagged with a motion indication parameter with a predefined value (e.g., 1) at the location in the frame where the change of the one or more pixels occurred. The image capturing device may highlight an area (or one or more areas 208, 209, 210) of the one or more frames 205, 206, 207 that are tagged with a motion indication parameter with a predefined value (e.g., 1). The image capturing device may determine that that no pixels of the plurality of pixels associated with the one or more frames 205, 206, 207 change in reference to a previous frame, and a respective area of each of the one or more frames 205, 206, 207 may be tagged with a motion indication parameter with a different predefined value (e.g., 0). The image capturing device may obfuscate/mask an area (or one or more areas 211, 212, 213) of the one or more frames 205, 206, 207 that are tagged with a motion indication parameter with a predefined value (e.g., 0).

The image capturing device may determine, based on respective pixels, whether the one or more frames 205, 206, 207 are indicative of a motion event based on a plurality of motion indication parameters. At 214, the image capturing device may determine (e.g., accumulate, etc.) and/or store a plurality of motion indication parameters. The image capturing device may determine and/or store a plurality of motion indication parameters over a time period (e.g., a day(s), a week(s), etc.).

At 215, the image capturing device may compare the plurality of motion indication parameters accumulated/stored over a period of time (e.g., a day(s), a week(s), etc.) to a threshold. An amount of motion indication parameters with a value of 1 may satisfy or exceed a threshold value. The threshold value may be based on any amount or value of motion indication parameters. Motion indication parameters with a value of 1 may exceed a threshold value set for 50 motion indication parameters with a value of 1. The image capturing device, based on the accumulated/stored motion indication parameters may determine activity/motion events frequently occurring within a particular region of interest (ROI).

At 216, the image capturing device may determine a region of interest (ROIs) within the field of view 202 of the image capturing device with a high frequency of activity/motion (e.g., motion indication parameters exceeding a threshold, etc.) and notify a user. The image capturing device may send a notification 217 to the user that requests that the user confirms whether the user would like to continue to receive notifications of activity/motion occurring within a ROI 218. The notification 217 may be sent to the user via a short range communication technique (e.g., BLUETOOTH®, near-field communication, infrared, etc.) or a long range communication technique (e.g., WIFI, cellular, satellite, Internet, etc.). The notification 217 may be a text message, a notification/indication via an application, an email, a call, or any type of notification. The user may receive a message, via a user device, such as "Are you interested in the events in the region in the future?", "do you want to be notified of events on the road?", or any type of message. If the user does not desire continued notification of activity/motion occurring within the ROI 218, the image capturing device may cease notifications and/or filter/cease detection of activity/motion occurring within the ROI 218. By filtering/ceasing detection of activity/motion occurring within a ROI, the image capturing device may avoid/reduce notifications of action/motion events, such as trees/flags moving due to wind, rain/snow, shadows, and the like that may not be of interest to the user.

Figure 3:
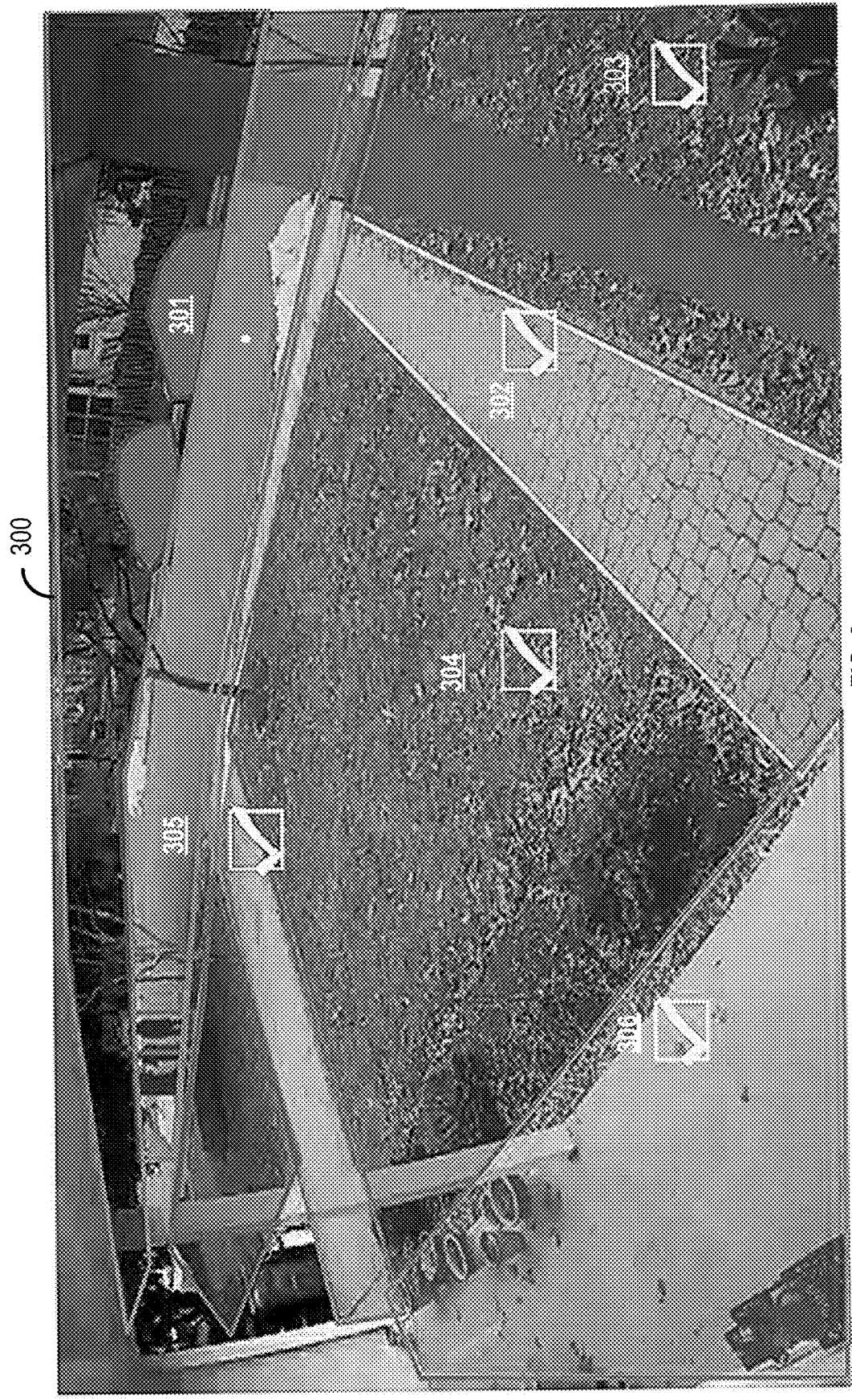
FIG. 3 shows an image of a scene captured in the field of view of a camera.

FIG. 3 shows a region segmentation map 300 used to train a camera system (e.g., the image capturing device 102, a camera-based neural network, etc.) to automatically detect/determine one or more regions in scenes captured in a field of view of the camera system. The region segmentation map 300 may be generated during a training/registration procedure associated with a camera system. The camera system may capture the image shown in the region segmentation map 300. A user may use the region segmentation map 300 to provide geometric and/or topological information/data to the camera system. An interface associated with the camera system (e.g., the communication element 106, etc.) may display the image shown in the region segmentation map 300 (e.g., a scene in a field of view of the camera system). The user may use an interface, a touchscreen, a keyboard, a mouse, and/or the like to identify geometric and/or topological information/data. The user may use an interface (e.g., the communication element 106, etc.) to generate/create the region segmentation map 300 by identifying/tagging regions of interests (ROIs) within the image of the scene.

The region segmentation map 300 may be tags/labels determined by the user such as, a road 301, a sidewalk 302, a lawn 303, a lawn 304, a driveway 305, or general area 306. One or more region segmentation maps may be used to train the camera system and/or any other camera system (e.g., a camera-based neural network, etc.) to automatically identify/detect regions of interest (ROIs) associated with a scene within its field of view. The camera system and/or any other camera system (e.g., a camera-based neural network, etc.) may use the general geometric and/or topological information/data (e.g., one or more region segmentation maps, etc.) as template and/or general information to predict/determine portions and/or regions of interest (e.g., a street, a porch, a lawn, etc.) associated with any scene (e.g., a new scene) in its field of view.

Figure 4:
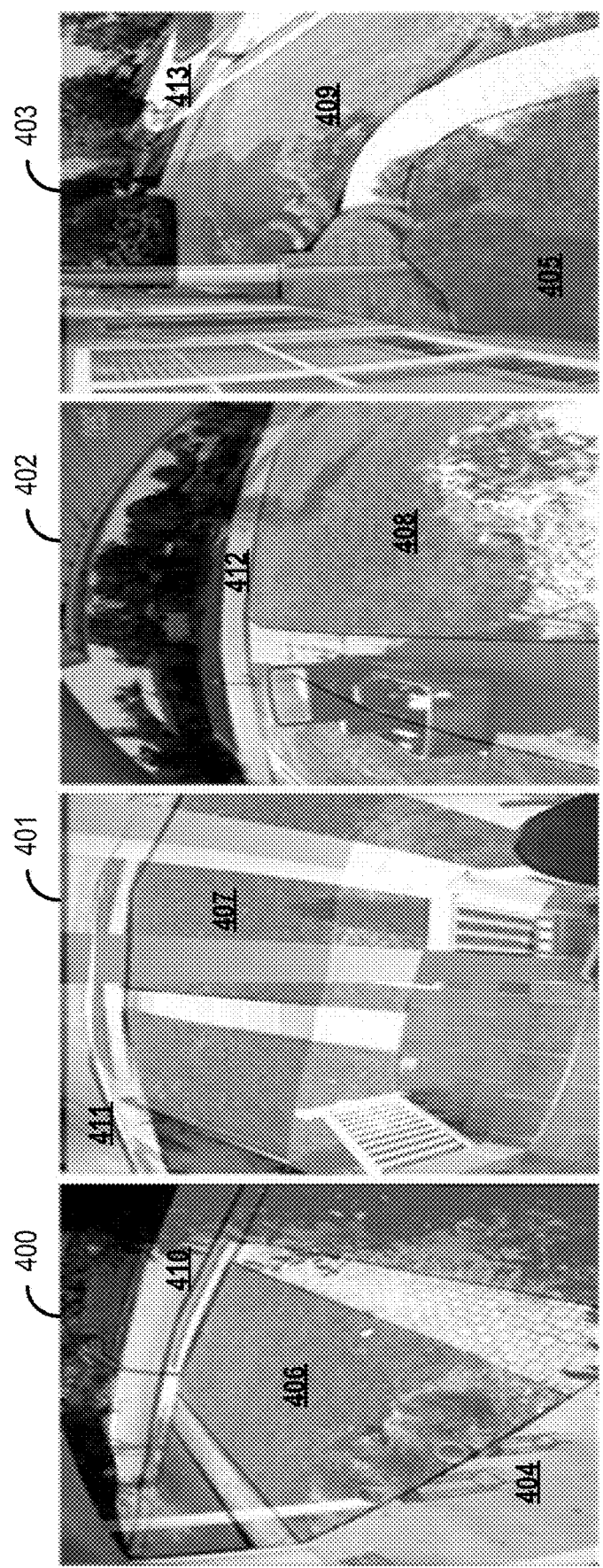
FIG. 4 shows region maps determined from scenes in a field of view of a camera.

FIG. 4 shows region segmentation maps 400, 401, 402, and 403. The region segmentation maps 400, 401, 402, and 403 may be automatically determined/predicted by a camera system (e.g., the image capturing device 102, a camera-based neural network, etc.) based on a region segmentation map (e.g., the region segmentation map 300) used to train the camera system (e.g., the image capturing device 102, a camera-based neural network, etc.) to automatically detect/determine one or more regions in scenes captured in a field of view of the camera system.

The region segmentation maps 400, 401, 402, and 403 may represent geometry and topology of scene layouts, such as new scenes (e.g., scenes/images not previously captured by and/or introduced to the camera system, etc.) captured in the field of view of a camera system (e.g., the image capturing device 102, etc.). A region map may be generated based on the identified/detected regions. The region map may be used to train a camera system to automatically identify/detect regions within a field of view. The camera system may automatically determine that a region within its field of view is a home/porch, street, or the like. The region segmentation maps 400 and 403 each show different homes/porches, 404 and 405 respectively, that have been automatically determined as such by the camera system. The region segmentation maps 400, 401, 402, and 403 each show different lawns, 406, 407, 408, and 409 respectively, that have been automatically determined as such by the camera system. The region segmentation maps 400, 401, 402, 403 each show different streets, 410, 411, 412, and 413 respectively, that have been automatically determined as such by the camera system.

Figure 5:
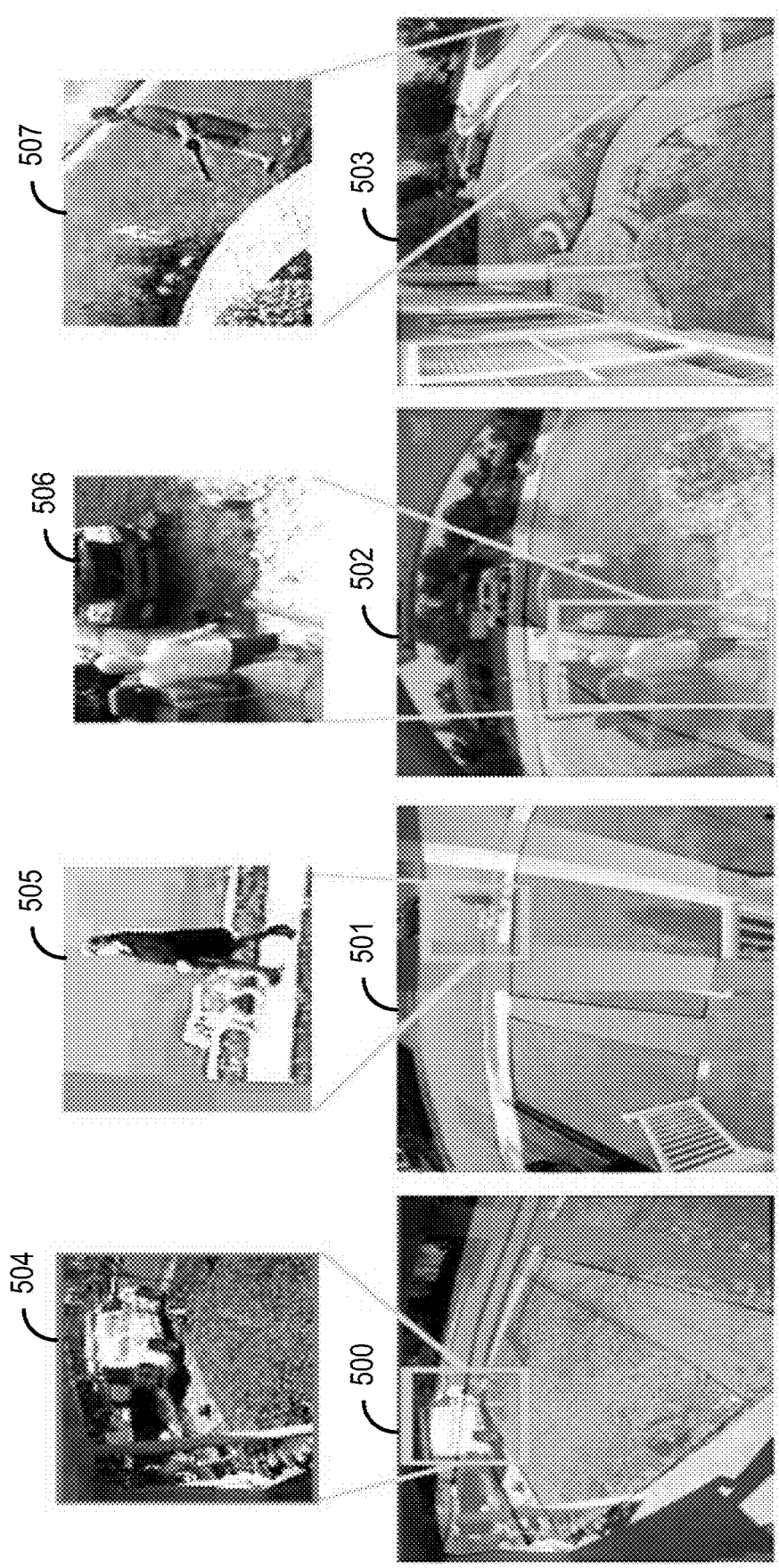
FIG. 5 shows actions/motions occurring in a field of view of a camera.

FIG. 5 shows actions/motions occurring in a field of view of a camera system (e.g., the image capturing device 102, etc.). The camera system may use one or more identification algorithms (e.g., a facial recognition algorithm, an object recognition algorithm, a landmark recognition algorithm, a motion recognition algorithm, etc.) to detect a particular object and/or action/motion occurring in a particular region within its field of view. The camera system may use a layout-induced video representation (LIVR) method to detect a particular object and/or action/motion occurring in a particular region within its field of view. The LIVR method is described in subsequent sections herein. Region segmentation maps 500, 501, 502, 503 each feature an action occurring within a field of view of a camera system. Region map 500 shows a vehicle in a driveway moving away from a home (504). Region map 501 shows a person and a pet moving along a sidewalk (505). Region map 502 shows a person in a driveway moving away from a home (506). Region map 503 shows a person moving across a lawn (507).

A camera-based neural network may be used for surveillance. The network must be able to identify actions occurring within a field of view of a camera. Such actions are generally associated with locations and directions. A camera system (e.g., the image capturing device 102, etc.) and/or a camera-based neural network may be configured to detect/identify certain actions occurring within a field of view of a camera and ignoring other actions. A user of a camera system may be interested in detecting (e.g., having an alert or notification generated, etc.) a person walking towards a front door of a house within the field of view of the camera system, and may be uninterested in detecting a person walking along the sidewalk that is also within the field of view. As such, the user's interest may be based on how objects captured in a field of view interact with the geometry and topology of a scene captured by the camera system. However, the layout of scenes captured in a field of view may vary significantly. Therefore a camera system (e.g., a camera-based neural network) must discriminately identify/determine actions occurring with a field of view of an associated camera. The camera system (e.g., the image capturing device 102, etc.) may use one or more identification algorithms (e.g., a facial recognition algorithm, an object recognition algorithm, a landmark recognition algorithm, a motion recognition algorithm, etc.) to detect a particular object and/or action/motion occurring in a particular region within its field of view. The camera system may use a layout-induced video representation (LIVR) method to detect a particular object and/or action/motion occurring in a particular region within its field of view. The camera system (e.g., a camera-based neural network) may be trained (e.g., trained during a training/registration procedure) to represent geometry and topology of scene layouts (e.g., scenes captured within a field of view of a camera) so that the camera system may use scenes determined during training to generalize/determine unseen layouts.

Figure 6:
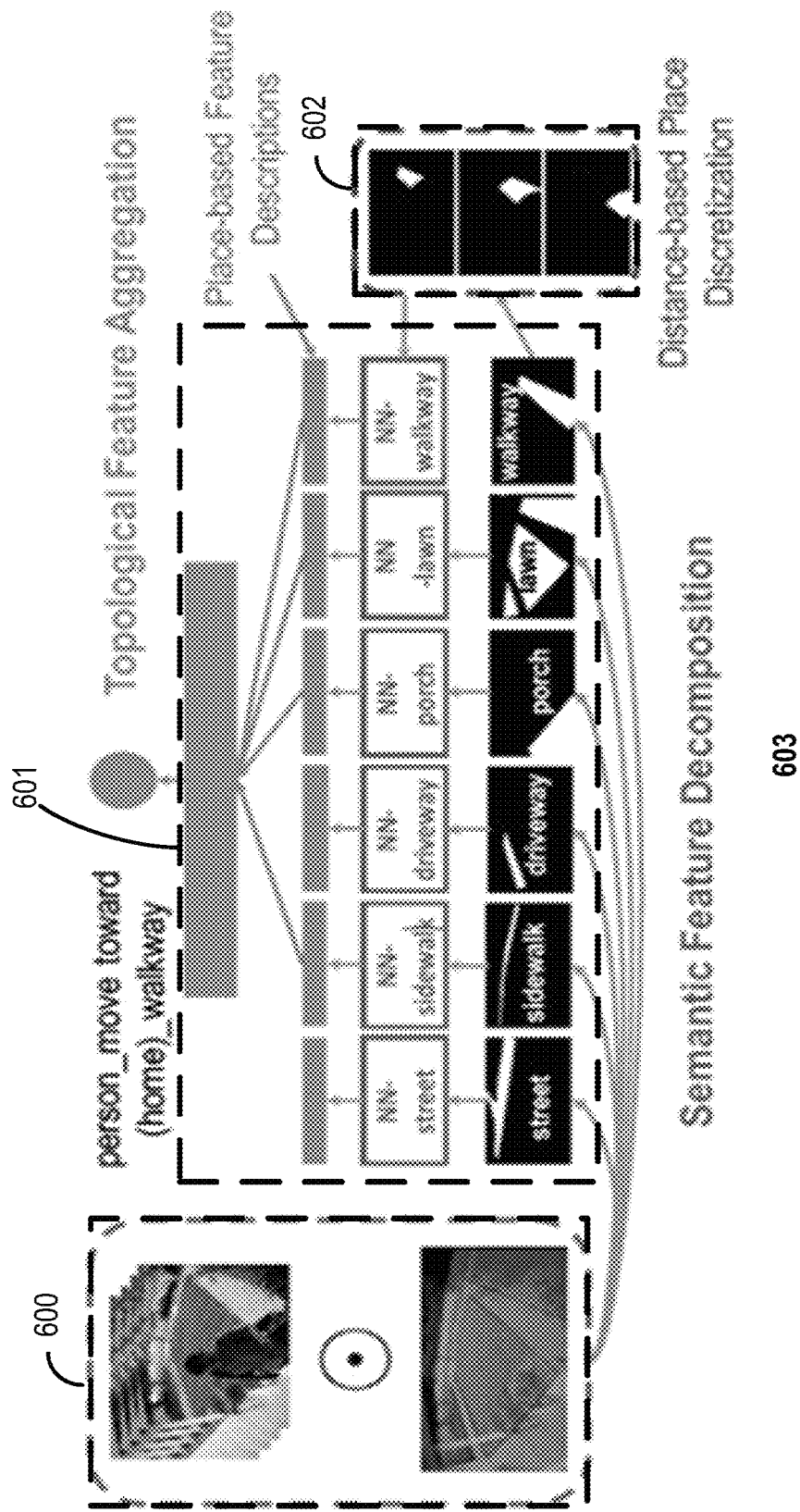
FIG. 6 shows semantic feature decomposition and topological feature aggregation according to the present methods and systems.

FIG. 6 is a graphical depiction (e.g., a layout-induced video representation (LIVR)) of a method that a camera system may use to detect a particular object and/or action/motion occurring in a particular region within its field of view. The camera system may abstract away appearance variations between scenes within its field of view (e.g., variations in scenes caused by a change in a location of the camera system, etc.). To abstract away appearance variations between scenes within its field of view, the camera system may encode a scene layout based on a region segmentation map determined from a previous scene in the camera system's field of view. A layout-induced video representation (LIVR) may be three components: a semantic component, a geometric component, and a topological component.

A semantic component 600 may be represented by characteristic functions (e.g., region-labels) of scene layouts (e.g., a set of bitmaps used for feature aggregation in convolutional layers of a neural network referred to as "places"). A geometric component 602 may be represented by a set of coarsely quantized distance transforms of each semantic place incorporated into the convolutional layers of a neural network (NN). A topological component upper part of 601 may be represented through the connection structure in a dynamically gated fully connected layer of the network—essentially aggregating representations from adjacent (more generally h-connected for h hops in the adjacency graph of the region segmentation map). The components 600, 601 and 602 require semantic feature decomposition as indicated at 603.

Bitmaps encoded with the semantic labels of places (e.g., "street," "sidewalk," "walkway," "driveway," "lawn," "porch," etc.) may be utilized to decompose video representations of scenes within a field of view of the camera system into different places (e.g., regions of interest, etc.) and train a camera-based neural network to learn/identify place-based feature descriptions (e.g., a street, a sidewalk, a walkway, a driveway, a lawn, a porch, etc.). Such decomposition encourages the camera-based neural network to learn features of generic place-based motion patterns that are independent of scene layouts. As part of the semantic feature decomposition, scene geometry may be encoded to model moving directions by discretizing a place into parts based on a quantized distance transform with regard to another place. The component 602 shows discretized bitmaps of walkway with regard to porch.

Figure 7:
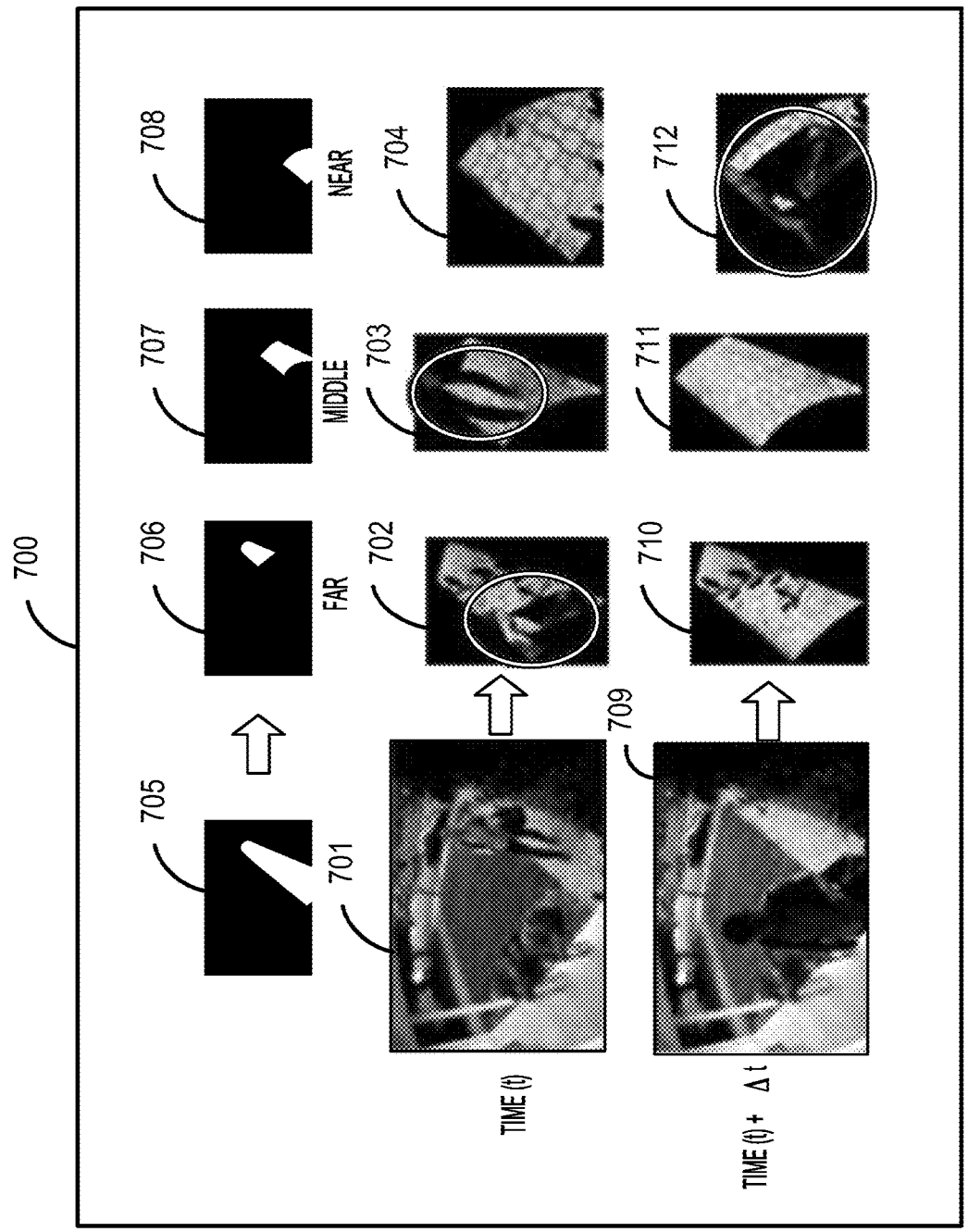
FIG. 7 shows place discretization and topological feature aggregation.

FIG. 7 shows features decomposed by the discretized bitmaps shown in FIG. 6 at 602. 700 is a capture of moving agents in spatial-temporal order, which reveals the moving direction, and may be generalized to different scene layouts. 701 is an image captured by a camera system (e.g., the image computing device 102, etc.) that shows a scene where a person is walking on a walkway towards a house, occurring at time (t). Images (e.g., bitmaps) 702, 703, and 704 each show masked portions of the image 701 occurring at time (t). Image 705 is a bitmap (e.g., region segmentation map) where all objects are masked and only a walkway is revealed (e.g., an original walkway mask of 701). Discretized bitmaps 706, 707, and 708 show a far portion of the walkway, a middle portion of the walkway, and a near portion of the walkway, respectively. 709 is an image captured by the camera system (e.g., the image computing device 102, etc.) that shows a scene where the person is still walking on the walkway towards the house at a point in time occurring after the image 701. Images (e.g., bitmaps) 710, 711, and 712 each show masked portions of the image 709 occurring at time (t+Δt).

The confidence of an action may be predicted by the camera system (e.g. camera-based neural network, etc.) by using place-based feature descriptions. For example, since the actions occurring in one place may also be projected onto adjacent places from a camera field of view, the confidence of an action may be predicted by dynamically aggregating features on the place which is associated with that action and its adjacent places. Topological feature aggregation may control the "on/off" of neuron connections from place-based feature descriptions to action nodes at both training and testing time based on scene topological connectivity.

To evaluate the LIVR, a dataset may be collected. The data set may be referred to as an Agent-in-Place Action dataset. The Agent-in-Place Action dataset may be over 5,000 15-second videos obtained from different surveillance scenes (e.g., 26 different surveillance scenes) with approximately 7,100 actions from 15 categories. To evaluate the generalization of LIVR, the scenes may be split into observed and unseen scenes. As described later in detail, experiments show that LIVR significantly improves the generalizability of a camera system (e.g., a camera-based neural network, etc.) trained only by observed scenes and tested on unseen scenes (improving the mean average precision (mAP) from around 20% to more than 51%). Consistent improvements are observed on almost all action categories.

Figure 8:
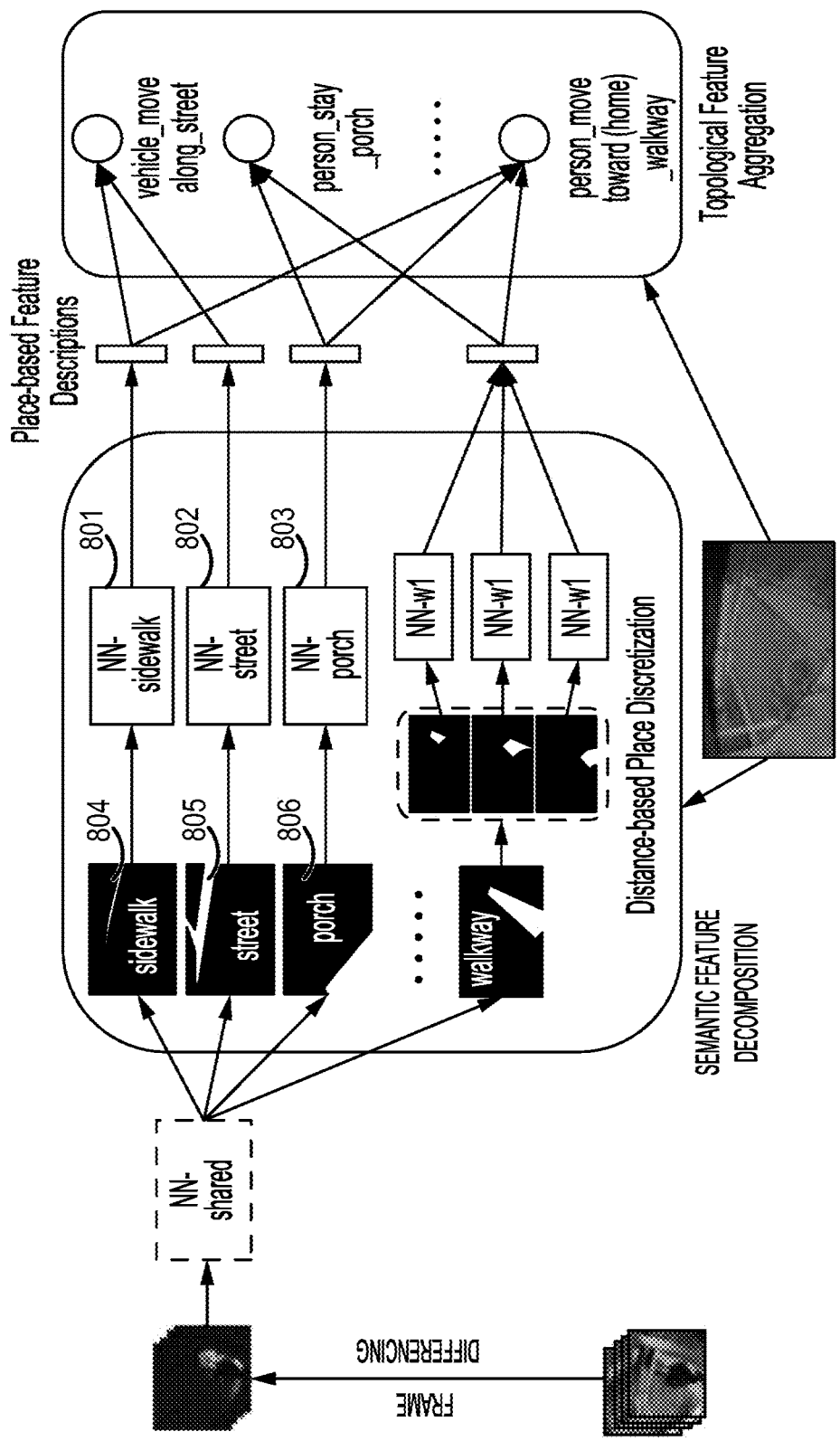
FIG. 8 shows a flowchart for the detailed implementation of semantic feature decomposition and topological feature aggregation.

FIG. 8 shows a general architecture of a camera-based neural network trained by a layout-induced video representation method. For each video (e.g., video captured by a camera), sampled frames of a video clip may be stacked into a 4-D input tensor. Frame differences may be used as an input since they suppress the influence of scene background and encourage the camera-based neural network to capture more abstract visual concepts. The camera-based neural network may be composed of 3D Convolution (3D-conv) blocks. A key component is semantic feature decomposition, which decomposes feature maps (e.g., region segmentation maps) according to region semantics obtained from given segmentation mask. Feature decomposition may be applied after any 3D-conv layer. Spatial Global Max Pooling (SGMP) may be applied to extracted features within places, and allow the camera-based neural network to learn abstract features independent of shapes, sizes and absolute coordinates of both places and moving agents. To predict each action label, the camera-based neural network may aggregate features from different places based on their connectivity in a region segmentation map (e.g., Topological Feature Aggregation).

Semantic feature decomposition may entail the use of a region segmentation map of each place to decompose features and force the network (e.g., neural network, etc.) to extract place-based feature descriptions individually. Region segmentation maps may be manually constructed and a labeling may be used to annotate each place by drawing points to construct polygons. In addition, to differentiate some of the actions (e.g., person_move toward (home)_walkway and person_move away (home)_walkway), place descriptions may be extended by segmenting a place into several parts based on its distance to an anchor place to allow the network (e.g., neural network, etc.) to explicitly model moving directions with respect to the anchor place.

Given a region segmentation map, place based feature descriptions (PD) may be extracted as shown at 801, 802, and 803 by place based descriptions "sidewalk," "street," and "porch," respectively. The region segmentation map represented by a set of binary masks 804, 805, and 806 may be used to decompose feature maps spatially into regions, each capturing the motion occurring in a certain place (e.g., motion occurring on a sidewalk, motion occurring on a street, motion occurring on a porch, etc.). The decomposition may be applied to features instead of raw inputs to retain context information. $X_L \in \mathbb{R}^{w_L \cdot h_L \cdot t_L * c}$ may be the output tensor of the $L^{th}$ conv block, where $w_L$; $h_L$; $t_L$, denote its width, height and temporal dimensions, and c is the number of feature maps. The place-based feature description of a place indexed with p is:

$$f_{L,p}(X_L \odot \mathbb{I}_{[M_L = p]})$$

where $M_L \in \mathbb{I}^{w_L \cdot h_L \cdot 1}$ is the segmentation index map and $\odot$ is a tiled element-wise multiplication which tiles the tensors to match their dimensions. Place descriptions may be extracted from different levels of feature maps. L=0 means the input level; L∈{1, 2, 3, 4, 5} means after the $L^{th}$ 3D-conv blocks. A higher L generally allows the 3D ConvNet to observe more context and abstract features. L may be treated as a hyper-parameter of the framework.

Many actions are naturally associated with moving directions with respect to some scene element (e.g., the house in home surveillance). To teach the camera system (e.g., the image capturing device 102, a camera-based neural network, etc.) general patterns of the motion direction in different scenes, the place segmentation may be further discretized into several parts and features may be extracted from each part. The features may be aggregated to construct the place-based feature description of the place. The word "porch" may be used as the anchor place as shown in FIG. 9 (900). The distance between each pixel and the porch in a scene may be computed (e.g., computed using distance transform), a place may be segmented into k parts (e.g., any number of parts) based on distances to the porch. 900 shows distance-based place discretization. 900 also shows the porch distance transform of a scene. Let $D_L(x)$ be the distance transform of a pixel location x in the $L^{th}$ layer. The value of a pixel x in the part indexing map $$M\frac{\Delta}{L}$$

is computed as:

$$M\frac{\Delta}{L}(x) = \left[(D_L^{max}(x) - D_L^{min}(x))/(k(D_L(x) - D_L^{min}(x)))\right]$$

where $D_L^{max}(x)=\max\{D_L(x')|M_L(x')=M_L(x)\}$, and $D^{min}(x)=\min\{D_L(x')|M_L(x')=M_L(x)\}$ are the maximum and minimum of pixel distances in the same place. The max and min of pixel distances in the same place may be efficiently pre-computed. The feature description corresponding to the $i^{th}$ part of $p^{th}$ place in $L^{th}$ layer is:

$$f(\Delta/(L, p, i))(X_L) = X_L \odot H = \left[M_L = p \wedge M\frac{\Delta}{L} = i\right]$$

where ⊙ is the tiled element-wise multiplication. Discretizing a place into parts at different distances to the anchor place and explicitly separating their spatial-temporal features allows the representation to capture moving agents in spatial-temporal order and extract direction-related abstract features.

All places may not need to be segmented since some places (such as a sidewalk or a street) are not associated with any direction-related action (e.g., moving toward or away from the house). For these places, the whole-place feature descriptors $f_{L,p\_may}$ be extracted. Different choices of place discretization and the number of parts k may be used. To preserve temporal ordering, at 901, 3D-conv blocks with spatial only max pooling may be applied to extract features from each discretized place, and concatenate them channel-wise. Then, 3D-conv blocks with temporal-only max pooling may be applied to abstract temporal information. A 1-D place-based feature description may be obtained after applying GMP. The final description obtained after distance-based place discretization may have the same dimensions as non-discretized place descriptions.

Semantic feature decomposition may enable a feature description for each place to be extracted individually. In order for the camera system (e.g., the image capturing device 102, a camera-based neural network, etc.) to predict action labels, the place features may be aggregated. Each action may be mapped to a place. To predict the confidence of an action a occurring in a place p, features extracted far from place p may be considered distractors. To reduce interference by features from irrelevant places, the camera system (e.g., the image capturing device 102, a camera-based neural network, etc.) may ignore far away features. As previously described, the camera system (e.g., the image capturing device 102, a camera-based neural network, etc.) may ignore the far away features via Topological Feature Aggregation, which utilizes the spatial connectivity between places, to guide feature aggregation.

As shown in 902, given a scene segmentation map (e.g., a region segmentation map), a source place p and a constant h, the camera system (e.g., the image capturing device 102, a camera-based neural network, etc.) may employ a Connected Component algorithm to find the h-connected set $C_h(p)$ which considers all places connected to place p within h hops. The constant h specifies the minimum number of steps to walk from the source to a destination place. Given the h-connected place set $C_h$, we construct a binary action-place matrix ($T \in \mathbb{R}^{n_a * n_p}$) for the scene where $n_a$ is the number of possible actions and $n_p$ is the number of places. $T_{i,j}=1$ if and only if place j is in the $C_h$ of the place corresponding to action i. 902 shows a segmentation map with its action-place mapping, where $C_o(porch)=\{porch\}$, $C_1(porch)=\{porch, walkway, driveway, lawn\}$, $C_2(porch)$ includes all except for street, and $C_3(porch)$ covers all six places. Topological feature aggregation may be implemented at both training and testing using a gated fully connected layer with customized connections determined by the action-place mapping T. Given $n_p$ m-D features extracted from $n_p$ places, concatenation may form a $(n_p*m)$-D feature vector. T may be used to determine the "on/off" status of each connection of a layer between the input features and the output action confidences. Let $T*T \otimes \mathbb{1}^{1*m}$ be the actual mask applied to the weight matrix $W \in \mathbb{R}^{n_a*n_p m}$, where ⊗ is the matrix Kronecker product. The final output is computed by:

$$y=(W\Theta T^*)f^*,$$

where ⊙ is the element-wise matrix multiplication, and f* is the concatenated feature vector as the input of the layer. For simplicity, bias may be omitted. Let J be the training loss function (cross-entropy loss), considering the derivative of W, the gradient formulation is:

$$\nabla W^J = (\nabla_y J f^*) \in T^*$$

which is exactly the usual gradient ($\nabla s Jf^T$) masked by T*. To train the camera-based neural network, the gradients to connected neurons may be back-propagated.

A surveillance video dataset for recognizing agent-in-place actions may be implemented. Outdoor home surveillance videos may be collected from internal donors and webcams for duration (e.g., months) to obtain over 7,100 actions from around 5,000 15-second video clips with 1280*720 resolution. The videos are captured from 26 different outdoor cameras which cover various layouts of typical American families' front yards and back yards. 15 common agent-in-place actions may be selected to label and be represented as a tuple indicative of an action, the agent performing it, and the place where it occurs. The agents, actions, and places involved may be: Agent={person, vehicle, pet}; Action={move along, stay, move away (home), move toward (home), interact with vehicle, move across}; Place={street, sidewalk, lawn, porch, walkway, driveway}.

Figure 10:
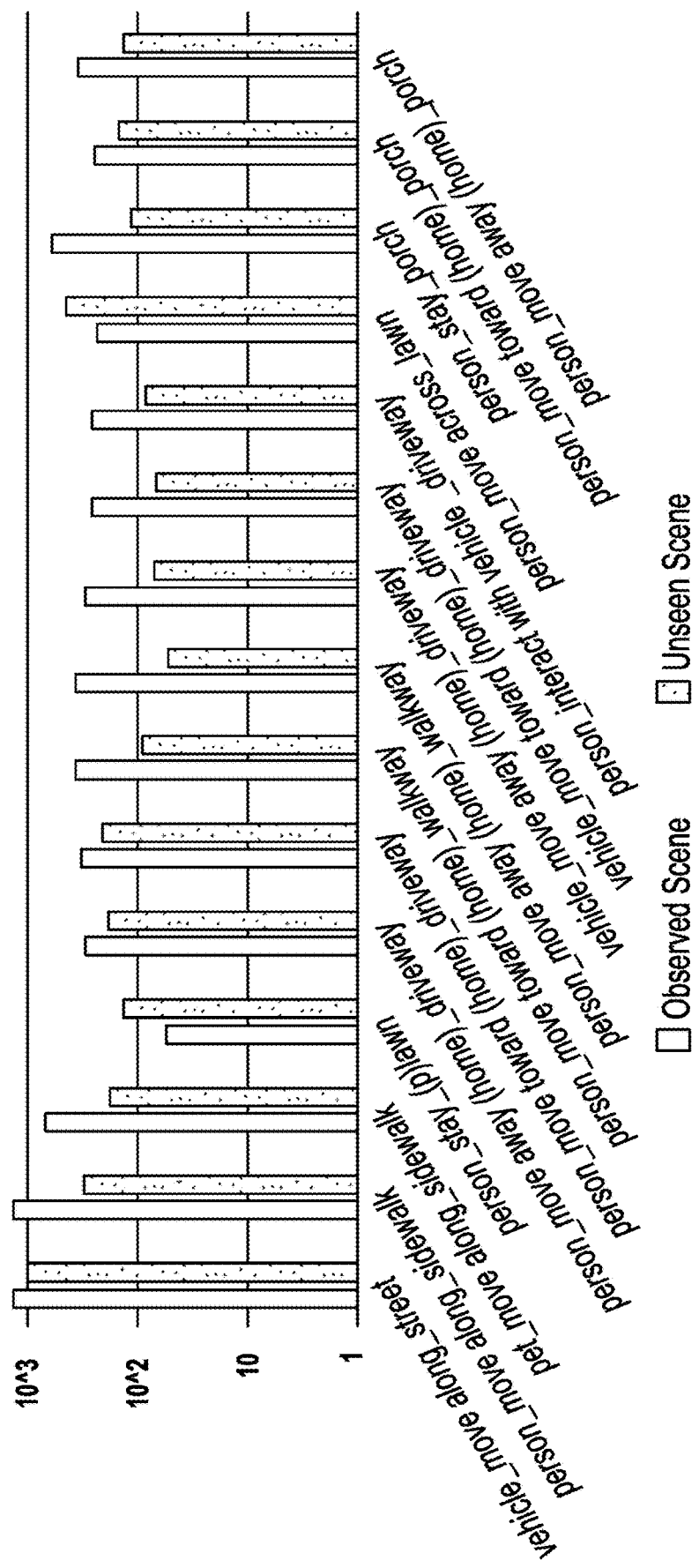
FIG. 10 shows a graph of experimental data.

The duration of each video clip may be 15 s, so multiple actions may be observed from a single agent or multiple agents in one video. Action recognition may be formulated as a multi-label classification task. A group of 26 cameras may be split into two sets, observed scenes and unseen scenes, to balance the number of instances of each action in observed and unseen scenes and at the same time cover more scenes in the unseen set. Training and validation of the model may be performed on observed scenes to test generalization of capability on the unseen scenes. FIG. 10. shows the detailed statistics of cleaned dataset.

A neural network may include a distinct architecture. Training the neural network may include decoupling the pooling into spatial only and temporal-only produced ideal performance. For each place-specific camera system (e.g., the image capturing device 102, camera-based neural network, etc.) that extracts place-based feature descriptions, nine blocks of 3D ConvNets are utilized with the first five blocks using spatial-only max pooling and the last four blocks using temporal-only max pooling. The first two blocks have one 3D-cony layer each, and there are two convolutional (cony) layers with ReLU in between for the remaining blocks. For each place-specific network, we use 64 3*3*3 cony filters per 3D-cony layer. After conducting SGMP on features extracted by each place-specific network, the final concatenated 1-D feature dimension is 6*64 since there are 6 places in total. The inference may be conducted with a gated fully connected layer, whose connections ("on/off" status) may be determined by action labels and scene topology. A sigmoid function may be used to obtain the predicted probability of each action. If conduct feature level decomposition (L>0) is conducted, a shared network may be used to extract low-level features. The detailed place-specific network structure is shown in the Table (Table 1) below.

TABLE 1

| Block | Input Size | Kernel Size | Stride | # Filters |
|---|---|---|---|---|
| Conv1 | 15 × 90 × 160 × 3 | 3 × 3 × 3 | 1 × 1 × 1 | 64 |
| Pool1 | 15 × 90 × 160 × 3 | 1 × 2 × 2 | 1 × 2 × 2 | — |
| Conv2 | 15 × 45 × 80 × 64 | 3 × 3 × 3 | 1 × 1 × 1 | 64 |
| Pool2 | 15 × 45 × 80 × 64 | 1 × 2 × 2 | 1 × 2 × 2 | — |
| Conv3 | 15 × 23 × 40 × 64 | 3 × 3 × 3 | 1 × 1 × 1 | 64 |
| Pool3 | 15 × 23 × 40 × 64 | 1 × 2 × 2 | 1 × 2 × 2 | — |
| Conv4 | 15 × 12 × 20 × 64 | 3 × 3 × 3 | 1 × 1 × 1 | 64 |
| Pool4 | 15 × 12 × 20 × 64 | 1 × 2 × 2 | 1 × 2 × 2 | — |
| Conv5 | 15 × 6 × 10 × 64 | 3 × 3 × 3 | 1 × 1 × 1 | 64 |
| Pool5 | 15 × 6 × 10 × 64 | 1 × 2 × 2 | 1 × 2 × 2 | — |
| Conv6 | 15 × 3 × 5 × 64 | 3 × 3 × 3 | 1 × 1 × 1 | 64 |
| Pool6 | 15 × 3 × 5 × 64 | 2 × 1 × 1 | 2 × 1 × 1 | — |
| Conv7 | 8 × 3 × 5 × 64 | 3 × 3 × 3 | 1 × 1 × 1 | 64 |
| Pool7 | 8 × 3 × 5 × 64 | 2 × 1 × 1 | 2 × 1 × 1 | — |

TABLE 1-continued

| Block | Input Size | Kernel Size | Stride | # Filters |
|---|---|---|---|---|
| Conv8 | 4 × 3 × 5/ 64 | 3 × 3 × 3 | 1 × 1 × 1 | 64 |
| Pool8 | 4 × 3 × 5 × 64 | 2 × 1 × 1 | 2 × 1 × 1 | — |
| Conv9 | 2 × 3 × 5 × 64 | 3 × 3 × 3 | 1 × 1 × 1 | 64 |
| Pool9 | 2 × 3 × 5 × 64 | 2 × 1 × 1 | 2 × 1 × 1 | — |
| SGMP | 1 × 3 × 5 × 64 | 1 × 3 × 5 | 1 × 1 × 1 | — |
| Gated FC | 1 × 1 × 1 × 384 | — | — | — |

For a dataset, the directions mentioned are all relative to a house location (e.g., where a camera is placed), and a porch is a strong indicator of the house location. A distance transform to the porch may be conducted, but the distance-based place discretization method may be generalized to represent moving direction with respect to any arbitrary anchor place (e.g., camera location).

An action recognition task may be formulated as multi-label classification without mutual exclusion. For input video frames, FPS 1 may be used and each frame may be down sampled to 160*90 to construct a 15*160*90*3 tensor for each video as input. Small FPS and low resolution are sufficient to model actions for home surveillance where most agents are large and the motion patterns of actions are relatively simple. The performance of recognizing each action may be evaluated independently. An Average Precision (AP) for each action and mean Average Precision (mAP) over all categories may be determined.

26 scenes are split into two sets: observed scenes and unseen scenes. The videos in observed scenes are further spit into training and validation sets with a sample ratio of nearly 1:1. A model may be trained on observed scenes and tested on unseen scenes. The validation set may be used for tuning hyper-parameters:semantics may be decomposed after the second cony blocks (L=2). Distance-based place discretization may be conducted on $PL_{DT}$={walkway; driveway; lawn} with k=3; for topological feature aggregation, h=1.

3D ConvNets may be used as a baseline (B/L) model. All three baseline models may share the same 3D ConvNets architecture, which is very similar to the architectures of each place-specific network that extracts place-based feature descriptions, except that the last layer is fully connected instead of gated through topological feature aggregation. The difference among baseline 1, 2 and 3 the respective inputs: B/L1 takes the raw frames as input; B/L2 applies frame difference on two consecutive frames; B/L3 incorporates the scene layout information by directly concatenating the 6 segmentation maps to the RGB channels in each frame, resulting in an input of 9 channels per frame in total. The baseline models were trained using the same setting as in the proposed model, and the performance of the baselines are shown in Column 2-5 in the Table (Table 2) below.

TABLE 2

| Network Architecture | B/L1 | B/L2 | B/L3 | B/L3 + MF | Ours V1 | Ours V2 | Ours V3 | Ours V4 | Ours V4 + H | Ours V4 + MF | Ours V4 + FPS2 |
|---|---|---|---|---|---|---|---|---|---|---|---|
| 3D ConvNet? | ✓ | ✓ | ✓ | ✓ | ✓ | ✓ | ✓ | ✓ | ✓ | ✓ | ✓ |
| frame differencing? | | ✓ | ✓ | ✓ | ✓ | ✓ | ✓ | ✓ | ✓ | ✓ | ✓ |
| Concate Map? | | | ✓ | ✓ | | | | | | | |
| place-based feature description? | | | | | ✓ | ✓ | ✓ | ✓ | ✓ | ✓ | ✓ |
| distance-based place discretization? | | | | | | | ✓ | ✓ | ✓ | ✓ | ✓ |
| topological feature aggregation? | | | | | | | ✓ | ✓ | ✓ | ✓ | ✓ |
| higher resolutions? | | | | | | | | | ✓ | | |
| more filters? | | | | | | ✓ | | | | ✓ | |
| higher FPS? | | | | | | | | | | | ✓ |
| Observed scenes mAP | 43.34 | 51.79 | 53.54 | 52.02 | 60.17 | 60.97 | 57.64 | 56.71 | 56.26 | 56.01 | 58.93 |
| Unseen scenes mAP | 14.62 | 18.46 | 20.96 | 16.12 | 41.54 | 44.73 | 46.57 | 51.41 | 49.13 | 51.87 | 50.31 |

Notably, adding frame differencing leads to significant performance improvements, marginal improvements are obtained by incorporating scene layout information using ConcateMap, and the testing performance gap between observed and unseen scenes is large, which reveals the poor generalization of the baseline models. In addition, a B/L3 model was trained with 6 times more filters per layer to evaluate whether model size is the key factor for the performance improvement. The result of this enlarged B/L3 model is shown in Column 5 of Table 2. Overall, the baseline models which directly extract features jointly from the entire video suffer from overfitting, and simply enlarging the model size or directly using the segmentation maps as features does not improve their generalization. More details about baseline models may be found in the supplementary materials.

Column 6-9 of Table 2 shows the mAP of the experimental models on observed scene validation set and unseen scene testing set. Notably there are three significant performance gaps, especially on unseen scenes: 1) from B/L3 to Ours-V1, over 20% mAP improvement is obtained by applying the proposed semantic feature decomposition to extract place feature descriptions; 2) from Ours-V1 to Ours-V3, the model is further improved by explicitly modeling moving directions by place discretization; 3) when compared to using a fully connected layer for feature aggregation (V1 and V3), the topological method (V2 and V4) leads to another significant improvement, which shows the efficacy of feature aggregation based on scene layout connectivity. Doubling the resolution (320*180), FPS (2) and number of filters (128) only results in a slight change of the model's accuracy (columns 10-12 in Table 2).

Figure 11:
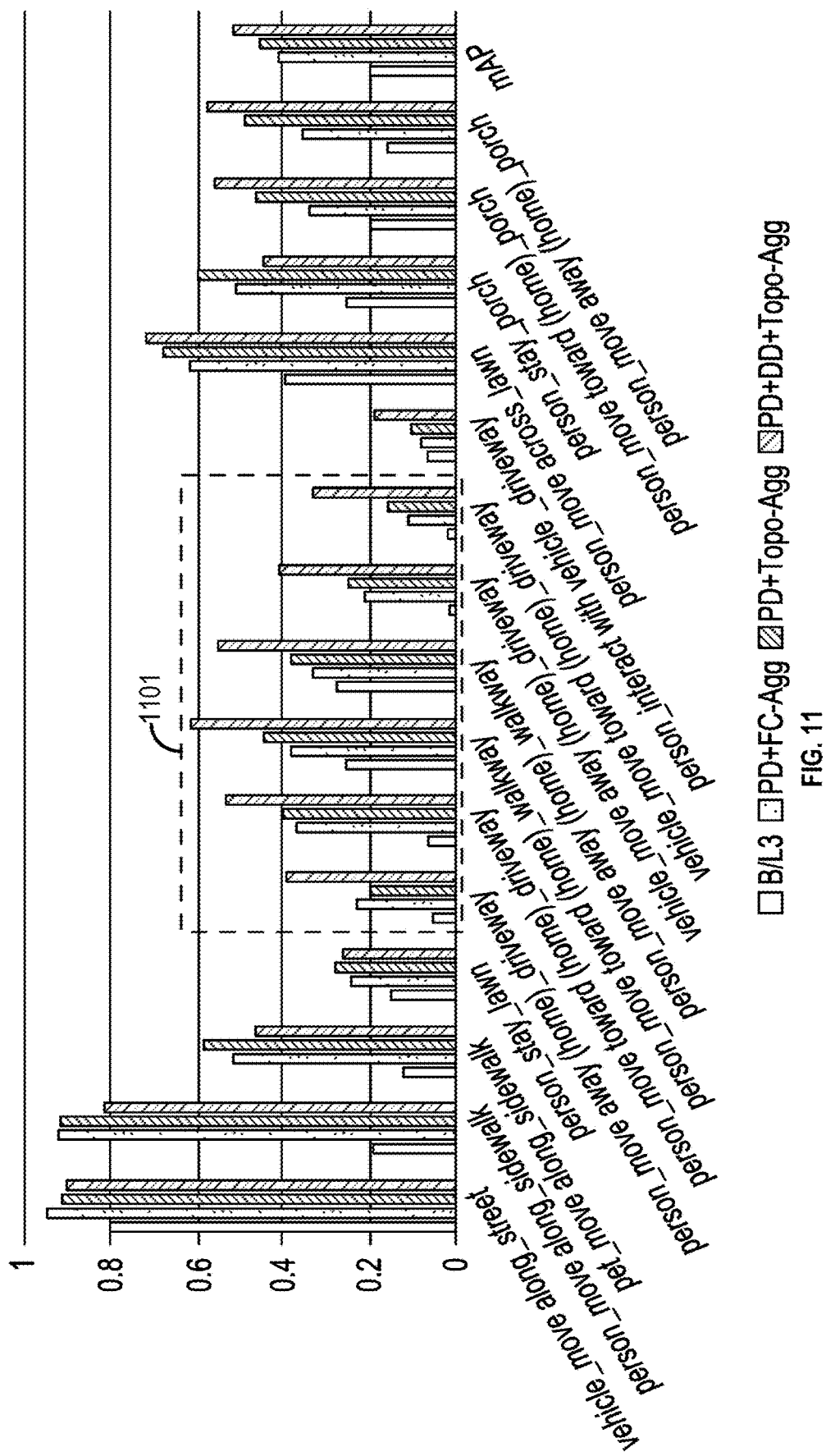
FIG. 11 shows a graph of experimental data.

FIG. 11 shows the average precision for each action on unseen scenes. The experimental method outperforms the baseline methods by a large margin on almost all action categories. When comparing PD+Topo-Agg and PD+DD+Topo-Agg in FIG. 11, it may be observed that the proposed topological feature aggregation (Topo-Agg) leads to consistently better generalization for almost all actions. The box 1101 highlights the actions that include moving directions, and consistent improvements are brought by distance-based place discretization (DD). For some actions, especially the ones occurring on street and sidewalk, since they are relatively easy to recognize, adding DD or Topo-Agg upon the place-based feature descriptions (PD) does not help much, and sometimes leads to slightly worse results. Overall, the experimental layout-induced video representation improves the generalization capability of the network, especially for actions that are more challenging, and are associated with moving directions.

Figure 12:
FIG. 12 shows actions visualized using three frames in temporal order and predicted probabilities of the ground truth actions.

FIG. 12 shows some actions visualized using three frames in temporal order and the predicted probabilities of the ground truth actions using different methods. It may be observed that for relatively easy actions such as vehicle_move_along_street, performance is similar across approaches. However, for challenging actions, especially actions requiring modeling moving directions such as person_move toward (home)_walkway, the experimental method shows significant success.

Figure 13:
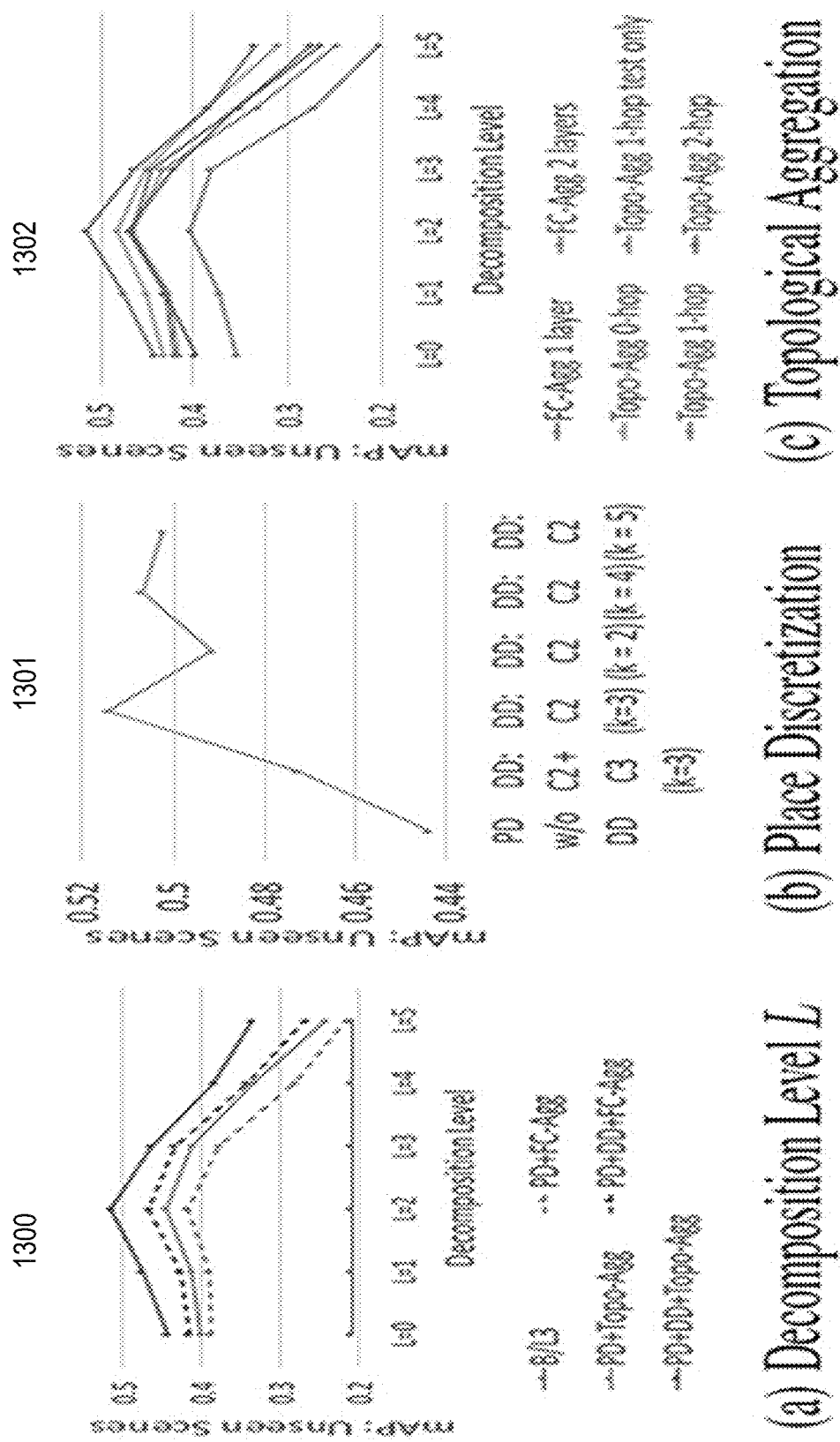
FIG. 13 shows a graph of experimental data.

Place-based Feature Description. The hyper-parameter for PD is the level L, controlling when to decompose semantics in different places. FIGS. 13 (1300 and 1302) show that the generalization capability of a camera system (e.g., the image capturing device 102, a camera-based neural network, etc.) is improved when the system is allowed to observe an entire video at input level, and decompose semantics at the feature level (after the $2^{nd}$ cony blocks). However, if place descriptions are extracted after a very late block (e.g., level 4 or 5), it may fail to improve the camera system generalizability.

Different strategies for determining places to be discretized and the number of parts to discretize (k) per place were reviewed. Besides the anchor place—porch, the remaining five places in the experimental dataset may be clustered into three categories with regard to the distance to camera: C1 includes only porch, which is usually the closest place to a camera; C2 includes lawn, walkway, driveway, and actions occurring in those places usually require modeling the moving direction directly; C3 includes sidewalk and street, which are usually far away from a house, and actions on them are not sensitive to directions (e.g., "move along"). The experimental camera system was evaluated with two strategies to apply DD on. First, all places belong to C2 and C3, and second, only places in C2. Results are shown at 1301. Applying DD on C3 does not help much, but if only DD is applied on places in C2, the experimental method achieves the best performance. In terms of the number of discretized parts k, we evaluate k from 2 to 5 may was evaluated and as shown in 1301, performance is robust when k≥3.

Different h values were evaluated to determine the h-connected set and different strategies to construct and utilize the action-place mapping T. The results are shown in 1302. Notably, Topo-Agg achieves its best performance when h=1, i.e., for an action occurring in place, features extracted from place P are aggregated and directly connected. Topo-Agg is compared to the naive fully connected inference layer (FC-Agg: 1 layer) and two fully-connected layers with 384 neurons each and a ReLU layer in between (FC-Agg: 2 layers). Notably, generalizability drops significantly with an extra fully-connected layer, which reflects overfitting. Topo-Agg outperforms both methods. A trained, fully connected inference layer comprising only aggregate features based on topology at testing time ("Topo-Agg: 1-hop test only") reflects worse performance.

Figure 14:
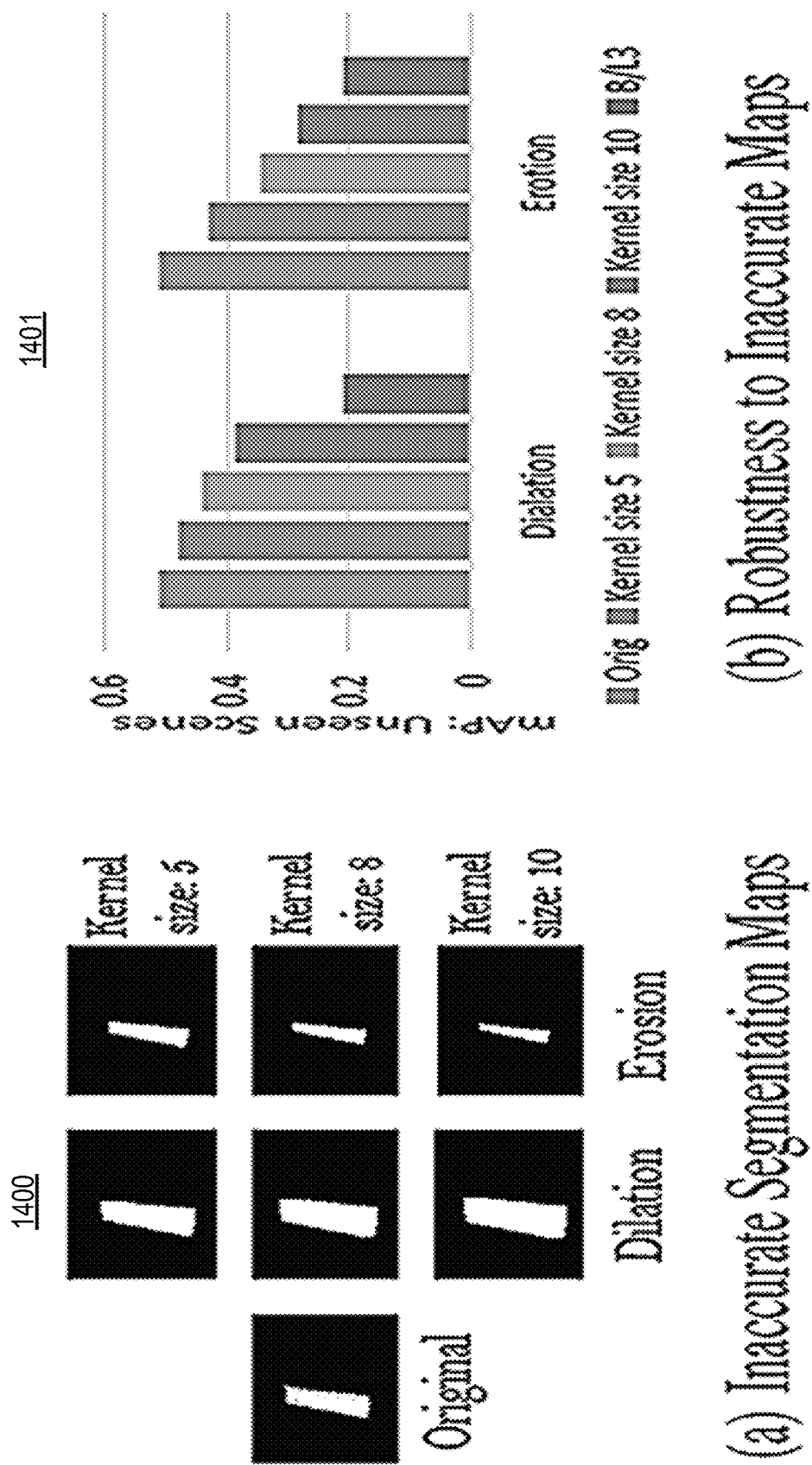
FIG. 14 shows a graph of experimental data.

The model described uses a user provided semantic map. To explore the sensitivity of the network to typical errors that would be encountered with automatically constructed semantic maps, dilation and erosion may be applied on the ground-truth maps to simulate the two situations which model inaccuracy. FIG. 14 (1400) shows possible inaccurate maps due to dilation and erosion with different kernel sizes, and the results of using PD+DD+Topo-Agg with the manipulated maps are shown as well (1401). Despite performance degradation, the experimental method shows significant improvements over the baselines. In addition, the experimental method is more robust to dilation than erosion, since with large erosion kernels, the network (e.g., neural network) may barely observe the motion patterns in a place.

Figure 15:
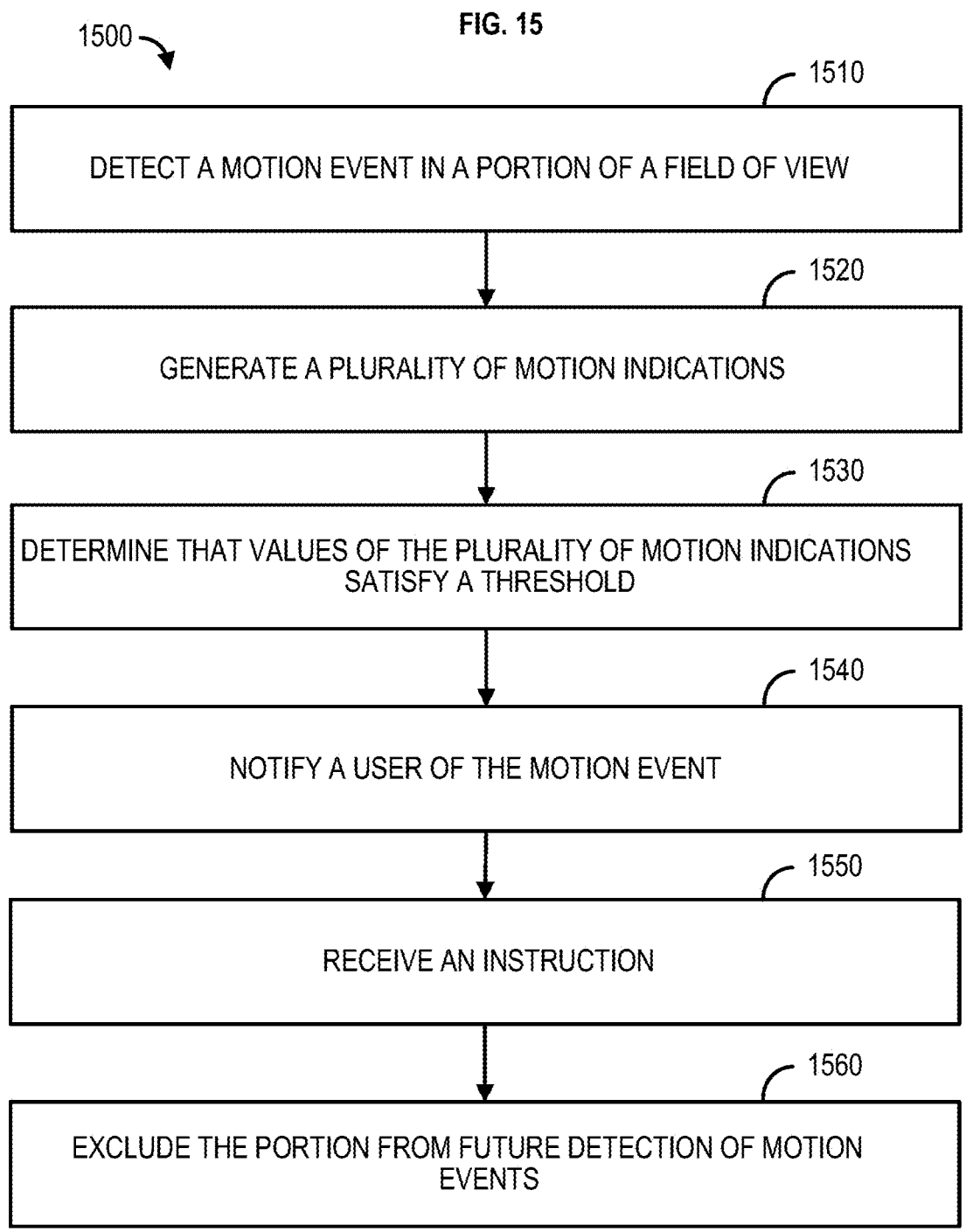
FIG. 15 shows s a flowchart of a method according to the present invention.

FIG. 15 is a flowchart of a method 1500. At 1510, a motion event may be detected. The motion event may be detected from content (e.g., a plurality of images, video, etc.) captured by a camera system (e.g., the image capturing device 102, etc.). The camera system may capture video of a scene within its field of view (e.g., field of view of the camera, etc.). The motion event may be detected in a portion of a plurality of portions of the scene within the field of view. The scene within the field of view may be partitioned into different portions, such as a lawn, a porch, a street, and or the like. The portions (e.g., the plurality of portions of the scene) may be selected by a user. The portions (e.g., the plurality of portions of the scene) may be automatically determined by the camera system. A portion may encompass another portion (e.g., a second portion is part of a first portion). The portion may also encompass only part of another portion (e.g., a first portion overlaps, at least partly, with a first portion). Each portion within the field of view may be processed individually (e.g., a notification may be triggered and provided to a user based on motion events detected in a first portion, while motion events detected in a second portion may be disabled from triggering a notification) or may be processed collectively (e.g., a notification may be triggered and provided to a user based on motion events detected in either, or both, of a first portion or a second portion).

The motion may be detected by determining a change in pixels between sequential frames (e.g., a previous frame and a current frame, etc.) of the video of the scene within the field of view. For each frame of the video a change in pixels from a previous frame may be determined. The camera system may analyze the video and determine whether a plurality of pixels associated with a frame of the video is different from a corresponding plurality of pixels associated with a previous frame of the video. Analysis of the video may be performed in incremental durations of the video, such as at every 15-second interval of the video.

At 1520, a plurality of motion indication parameters (e.g., motion indication values) may be determined/generated. Each frame of the video determined to have a change in pixels from a previous frame may be tagged with a motion indication parameter. If a change in the plurality of pixels associated with a frame is determined, the frame may be tagged with a motion indication parameter with a predefined value (e.g., 1) at the location in the frame where the change of pixel occurred. If it is determined that no pixels changed (e.g., the pixel(s) and its corresponding pixel(s) is the same, etc.), the frame may be tagged with a motion indication parameter with a different predefined value (e.g., 0). A plurality of frames associated with the video may be determined. The camera system may determine and/or store a plurality of motion indication parameters. The plurality of motion indication parameters may be determined and/or stored over a time period (e.g., a day(s), a week(s), etc.).

At 1530, the plurality of motion indication parameters may be compared to a threshold. The camera system may determine that the plurality of motion indication parameters satisfy a threshold. A given number of motion indication parameters with a value of 1 may satisfy or exceed a threshold value, such as 100 motion indication parameters with a value of 1 may satisfy/exceed a threshold value set for 50 motion indication parameters with a value of 1. A threshold value may be based on any amount or value of motion indication parameters. A region of interest (ROI) within the field of view of the camera may be determined based on the plurality of motion indication parameters compared to a threshold.

At 1540, a user may be notified of action/motion events. The camera system may provide a notification to a user device based on the plurality of motion indication parameters satisfying the threshold. The portion of the plurality of portions of the scene within the field of view of the camera system may be determined to be associated with a high frequency of motion events (e.g., as indicated by the motion indication parameters with a value of 1). A notification may be sent to the user device that requests the user to confirm whether the user desires continued notification of motion events occurring within the portion of the plurality of portions of the scene within the field of view of the camera system. The camera system may notify the user (e.g., the user device) via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification.

At 1550, the user may provide an instruction. The instruction may be in response to the notification the user received via the user device. The user may receive a message via the user device such as "do you want to ignore the event and/or events in this area?", "do you want to be notified of events on the road?" or any type of message. The user may reply to the notification with the instruction. The instruction may be sent to the camera system via a short range communication technique (e.g., BLUETOOTH®, near-field communication, infrared, etc.) or a long range communication technique (e.g., WIFI, cellular, satellite, Internet, etc.). The instruction may be provided via a text message, a reply via an application, an email, a call, etc.

At 1560, the portion of the plurality of portions of the scene within the field of view of the camera system may be excluded from future detections of motion events. The camera system may exclude the portion of the plurality of portions of the scene within the field of view of the camera system from future detections of motion events based on an exclusion threshold being satisfied. The exclusion threshold may be satisfied based on a high frequency of motion events detected in the portion within a short timeframe (e.g., 10 motion events detected within a one-hour timeframe). The exclusion threshold may be temporally based (e.g., a lower threshold during daytime and a higher threshold during nighttime). The excluded portion may be disabled from triggering a notification in response to detecting one or more motion events following the exclusion. Any previously excluded portion may be un-excluded based on the exclusion threshold no longer being satisfied over a timeframe. (e.g., 2 motion events detected within a one-hour timeframe).

The camera system may exclude the portion of the plurality of portions of the scene within the field of view of the camera system from future detections of motion events based on the instruction received from the user/user device. If the user does not desire continued notification of motion events occurring within the portion of the plurality of portions of the scene within the field of view of the camera system (as indicated by the instruction), the camera system may cease such notifications and/or filter/cease detection of motion events occurring within the portion of the plurality of portions of the scene within the field of view of the camera system. Based on the instruction, the camera system may still detect motion events occurring within the portion of the plurality of portions of the scene within the field of view of the camera system, yet the camera system may only notify the user if an amount of associated motion indicated parameters satisfy or exceed a threshold. The threshold may be automatically determined by the camera system and/or determined by the user.

The camera system may downgrade a processing priority of a portion of the plurality of portions of the scene within the field of view of the camera system based on a downgrade threshold being satisfied. The downgrade threshold may be satisfied based on a low frequency of motion events detected in the portion within a timeframe (e.g., 5 motion events detected within a two-hour timeframe). The downgrade threshold may be temporally based. The downgraded portion may trigger a notification in response to determining that one or more security settings have been violated (e.g., a detected motion event violates a security setting(s)). Security settings associated with the camera system may be based on any parameter, such as a number of persons approaching a house, a motion event detected at a certain time of day, a person entering a certain area/region within the field of view of the camera system, and/or the like. The downgraded portion may be excluded based on satisfying the exclusion threshold described above.

Figure 16:
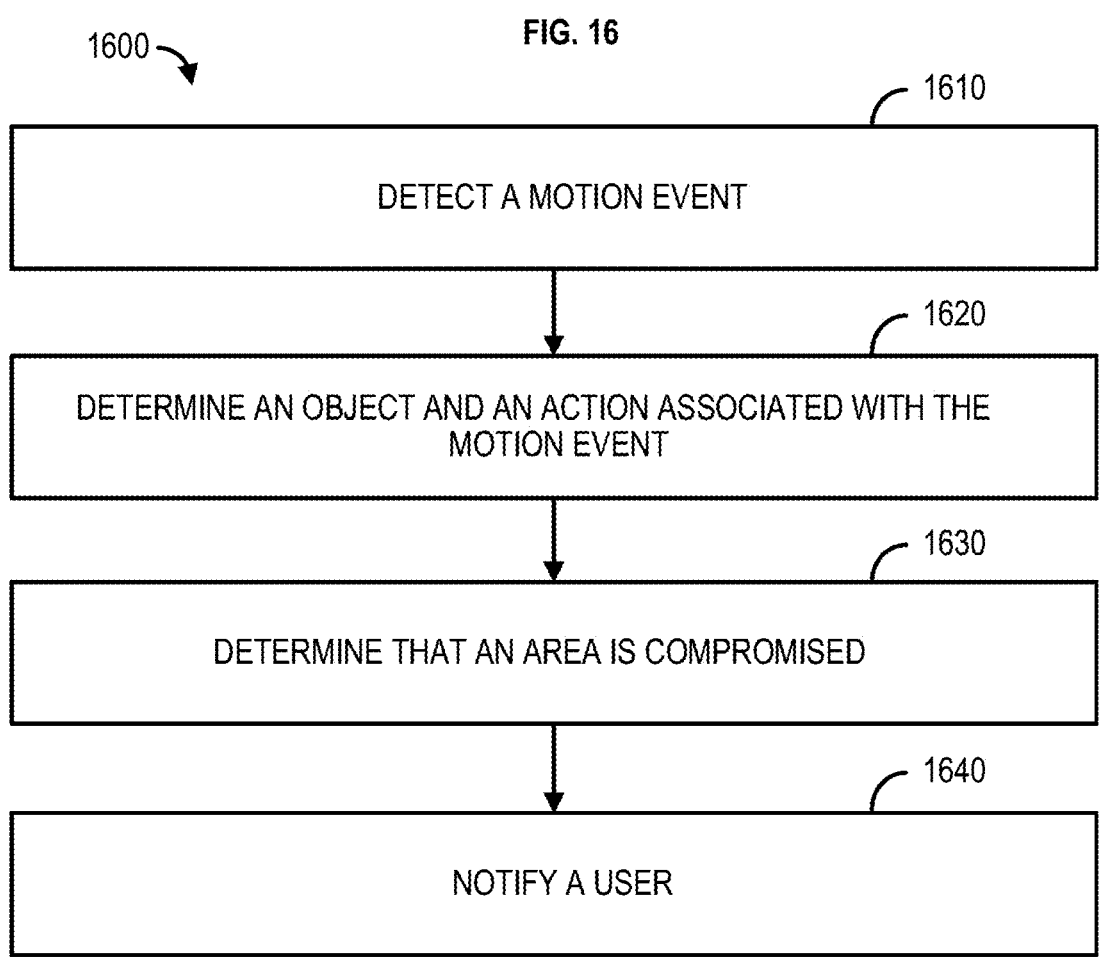
FIG. 16 shows a flowchart of a method according to the present invention.

FIG. 16 is a flowchart of a method 1600. At 1610, a motion event may be detected. The motion event may be detected from content (e.g., a plurality of images, video, etc.) captured by a camera system (e.g., the image capturing device 102, etc.). The camera system may capture video of a scene within its field of view (e.g., field of view of the camera, etc.). The motion event may be detected in a portion of a plurality of portions of the scene within the field of view. The scene within the field of view may be partitioned in to different regions of interest, such as a lawn, a porch, a street, and or the like. The regions of interest (e.g., the plurality of portions of the scene) may be selected by a user. The regions of interest (e.g., the plurality of portions of the scene) may be automatically determined by the camera system.

The motion may be detected by determining a change in pixels between sequential frames (e.g., a previous frame and a current frame, etc.) of the video of the scene within the field of view. For each frame of the video a change in pixels from a previous frame may be determined. The camera system may analyze the video and determine whether a plurality of pixels associated with a frame of the video is different from a corresponding plurality of pixels associated with a previous frame of the video. Analysis of the video may be performed in incremental durations of the video, such as at every 15-second interval of the video.

At 1620, an object associated with the motion event and action associated with the motion event may be determined. The camera system (e.g., the image capturing device 102, etc.) may determine the object and action associated with the motion event. The object and action associated with the motion event may be any object and any action, such as such as a person/animal walking towards/from a user's private property, vehicles passing by on a road in front of a home, flags/windmills in motion due to heavy wind, and the like. The camera system may use scene recognition, facial recognition, landmark recognition, spatial recognition, and the like to automatically identify regions, objects, and the like within in a scene within its field of view. The camera system may use a layout-induced video representation (LIVR) method to: determine regions of the scene (e.g., a porch, a street, a lawn, etc.), may abstract away areas (e.g., regions) of the scene where motion is not detected, and use a combination of semantic geometric, and topological analysis to determine the object and the action. The camera system may use the LIVR method to determine that a person if walking towards a home. The LIVR method is described in detail in previous sections of the present disclosure (e.g., FIG. 4-FIG. 9, etc.).

At 1630, it may be determined that an area within a field of view of a camera is compromised. The camera system (e.g., the image capturing device 102, etc.) may determine that an area within its field of view is compromised based on the determined object and action. The camera system may determine that a person is walking towards a home. The camera system may determine that the person walking towards the home compromises security settings associated with the camera system. Security settings associated with the camera system may be based on any parameter, such as a number of persons approaching a house, a motion event detected at a certain time, a time of day, a person entering a certain area/region within the field of view of the camera system, and/or the like.

At 1640, a notification may be provided to a user (e.g., a user device). The camera system may provide a notification to the user that the area within the field of view of the camera system is compromised. The camera system may provide a notification to the user/user device based on a detection that a person is walking towards the home. A notification may be sent to the user device that requests the user to confirm whether the user desires continued notification of such motion events occurring within the area within the field of view of the camera system. The camera system may notify the user (e.g., the user device) via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification.

Figure 17:
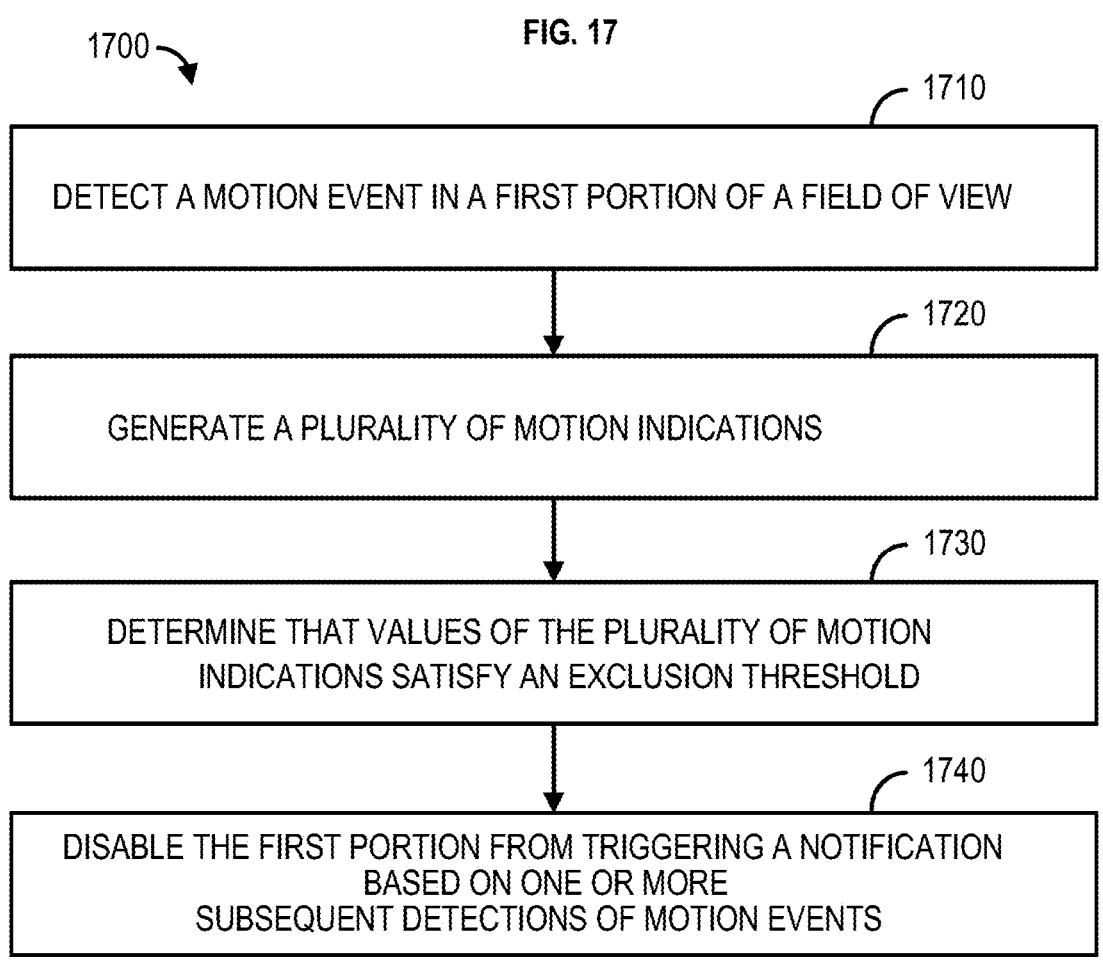
FIG. 17 shows a flowchart of a method according to the present invention.

FIG. 17 is a flowchart of a method 1700. At 1710, a motion event may be detected. The motion event may be detected from content (e.g., a plurality of images, video, etc.) captured by a camera system (e.g., the image capturing device 102, etc.). The camera system may capture video of a scene within its field of view (e.g., field of view of the camera, etc.). The motion event may be detected in a portion of a plurality of portions of the scene within the field of view. The scene within the field of view may be partitioned into different portions, such as a lawn, a porch, a street, and or the like. The portions (e.g., the plurality of portions of the scene) may be selected by a user. The portions (e.g., the plurality of portions of the scene) may be automatically determined by the camera system. A portion may encompass another portion (e.g., a second portion is part of a first portion). The portion may also encompass only part of another portion (e.g., a first portion overlaps, at least partly, with a first portion). Each portion within the field of view may be processed individually (e.g., a notification may be triggered and provided to a user based on motion events detected in a first portion, while motion events detected in a second portion may be disabled from triggering a notification) or may be processed collectively (e.g., a notification may be triggered and provided to a user based on motion events detected in either, or both, of a first portion or a second portion).

The motion may be detected by determining a change in pixels between sequential frames (e.g., a previous frame and a current frame, etc.) of the video of the scene within the field of view. For each frame of the video a change in pixels from a previous frame may be determined. The camera system may analyze the video and determine whether a plurality of pixels associated with a frame of the video is different from a corresponding plurality of pixels associated with a previous frame of the video. Analysis of the video may be performed in incremental durations of the video, such as at every 15-second interval of the video.

At 1720, a plurality of motion indication parameters may be determined/generated. Each frame of the video determined to have a change in pixels from a previous frame may be tagged with one or more motion indication parameters of the plurality. If a change in the plurality of pixels associated with a frame is determined, the frame may be tagged with a motion indication parameter with a predefined value (e.g., 1) at the location in the frame where the change of pixel occurred. If it is determined that no pixels changed (e.g., the pixel(s) and its corresponding pixel(s) is the same, etc.), the frame may be tagged with a motion indication parameter with a different predefined value (e.g., 0). A plurality of frames associated with the video may be determined. The camera system may determine and/or store a plurality of motion indication parameters. The plurality of motion indication parameters may be determined and/or stored over a time period (e.g., a day(s), a week(s), etc.).

At 1730, the plurality of motion indication parameters may be compared to a threshold. The camera system may determine that the plurality of motion indication parameters satisfy an exclusion threshold. A given number of motion indication parameters with a value of 1 may satisfy or exceed an exclusion threshold value, such as 100 motion indication parameters with a value of 1 may satisfy/exceed an exclusion threshold value set for 50 motion indication parameters with a value of 1. An exclusion threshold value may be based on any amount or value of motion indication parameters. A portion of the plurality of portions within the field of view of the camera may be determined based on the plurality of motion indication parameters compared to the exclusion threshold.

At 1740, the portion of the plurality of portions of the scene within the field of view of the camera system may be disabled from triggering notifications based on one or more subsequent detections of motion events within the portion. The camera system may disable the portion of the plurality of portions of the scene within the field of view of the camera system from triggering notifications based on one or more subsequent detections of motion events when an exclusion threshold being satisfied. The exclusion threshold may be satisfied based on a high frequency of motion events detected in the portion within a short timeframe (e.g., 10 motion events detected within a one-hour timeframe). The exclusion threshold may be temporally based (e.g., a lower threshold during daytime and a higher threshold during nighttime). Any previously excluded portion may be un-excluded based on the exclusion threshold no longer being satisfied over a timeframe (e.g., 2 motion events detected within a one-hour timeframe).

The camera system may exclude the portion of the plurality of portions of the scene within the field of view of the camera system from future detections of motion events based on an instruction received from the user/user device. If the user does not desire continued notification of motion events occurring within the portion of the plurality of portions of the scene within the field of view of the camera system (as indicated by the instruction), the camera system may cease such notifications and/or filter/cease detection of motion events occurring within the portion of the plurality of portions of the scene within the field of view of the camera system. Based on the instruction, the camera system may still detect motion events occurring within the portion of the plurality of portions of the scene within the field of view of the camera system, yet the camera system may only notify the user if an amount of associated motion indicated parameters satisfy or exceed a threshold. The threshold may be automatically determined by the camera system and/or determined by the user.

Based on a detected motion event, a user may be notified. The camera system may provide a notification to a user device based on the plurality of motion indication parameters satisfying the exclusion threshold. The portion of the plurality of portions of the scene within the field of view of the camera system may be determined to be associated with a high frequency of motion events (e.g., as indicated by the motion indication parameters with a value of 1). A notification may be sent to the user device that requests the user to confirm whether the user desires continued notification of motion events occurring within the portion of the plurality of portions of the scene within the field of view of the camera system. The camera system may notify the user (e.g., the user device) via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification.

The user may provide an instruction. The instruction may be in response to the notification the user received via the user device. The user may receive a message via the user device such as "do you want to ignore the event and/or events in this area?", "do you want to be notified of events on the road?" or any type of message. The user may reply to the notification with the instruction. The instruction may be sent to the camera system via a short range communication technique (e.g., BLUETOOTH®, near-field communication, infrared, etc.) or a long range communication technique (e.g., WIFI, cellular, satellite, Internet, etc.). The instruction may be provided via a text message, a reply via an application, an email, a call, or any type of response comprising the instruction.

The user may use an interface in communication with and/or associated with the camera system to view the notifications and to provide feedback indications in response to receiving the notification (e.g., a "Thumbs Up" button indicative of a notification being helpful; a "Thumbs Down" button indicative of a notification being unhelpful, and the like). The feedback indications may be sent through the interface to the camera system. Based on the feedback indications provided from the user after viewing a notification(s), the camera system may continue or may cease providing notifications for the region or regions associated with the notification(s). The camera system may continue providing notifications for the region or regions associated with the notification(s) when the feedback indicates the notification(s) are helpful or desirable (e.g., an indication of a "Thumbs Up" in response to viewing the notification(s); an indication that the notification(s) was viewed at least once; and the like). The camera system may cease providing notifications for the region or regions associated with the notification(s) when the feedback indicates the notification(s) are not helpful or not desirable (e.g., an indication of a "Thumbs Down" in response to viewing the notification(s); an indication that the notification(s) was not viewed; and the like).

Further, one or more subsequent motion events in the first portion may be detected. Based on the one or more subsequent motion events, a plurality of motion indication parameters associated with the one or more subsequent motion events may be generated in manner as described above. The camera system may then determine that the plurality of motion indication parameters associated with the one or more subsequent motion events no longer satisfy the exclusion threshold (e.g., 10 motion events detected within a three-hour timeframe). The camera system, based on the plurality of motion indication parameters associated with the one or more subsequent motion events no longer satisfying the exclusion threshold, may then enable the first portion such that it may trigger a notification based on the one or more subsequent detections of motion events.

The camera system may downgrade a processing priority of a portion of the plurality of portions of the scene within the field of view of the camera system based on a downgrade threshold being satisfied. The downgrade threshold may be satisfied based on a high frequency of motion events detected in the portion within an associated timeframe (e.g., 5 motion events detected within a two-hour timeframe). The number of motion events required to satisfy the downgrade threshold, as well as the associated timeframe during which the motion events are detected, may be defined by the camera system or by a user of the camera system. The downgrade threshold may be temporally based such that the downgrade threshold may be satisfied with a fewer number of detected motion events during a first timeframe (e.g., nighttime hours) as compared to a second timeframe (e.g., daytime hours). In this way, a fewer number of detected motion events may satisfy the threshold when they are detected during hours corresponding to a certain timeframe(s). (e.g., nighttime). The number of motion events required to satisfy the downgrade threshold during a certain time period (e.g., nighttime versus daytime), as well as the associated timeframe during which the motion events are detected (e.g., between a time corresponding to dusk and a time corresponding to dawn), may be defined by the camera system or by a user of the camera system.

A downgraded processing priority may be associated with triggering a notification (e.g., a notification sent to a user device) in response to the camera system detecting a motion event with less frequency as compared to a frequency of triggering notifications prior to the processing priority being downgraded. For a portion having a processing priority that has not been downgraded, a notification may be triggered each time a motion event is detected. For a portion having a downgraded processing priority, a notification may be triggered despite the processing priority having been downgraded (e.g., the downgraded processing priority may be overcome) when an average number of motion events detected in the portion in a given timeframe is less than a number of detected motion events that satisfy the downgrade threshold (e.g., 5 motion events detected within a two-hour timeframe may satisfy the downgrade threshold, and a notification may nonetheless be triggered when only 1 motion event is detected in a subsequent four-hour timeframe). The number of motion events required to overcome the downgraded processing priority and to cause a notification to be triggered, as well as the associated timeframe during which the motion events are detected, may be defined by the camera system or by a user of the camera system.

The camera system may also be configured such that a notification is triggered despite the processing priority having been downgraded (e.g., the downgraded processing priority may be overcome) only in response to determining that one or more security settings have been violated (e.g., a detected motion event violates a security setting(s) and a notification is caused to be triggered as a result). Security settings associated with the camera system may be based on any parameter, such as a number of persons approaching a house, a motion event detected at a certain time of day, a person entering a certain area/region within the field of view of the camera system, and/or the like. The downgraded portion may be excluded based on satisfying the exclusion threshold described above.

Figure 18:
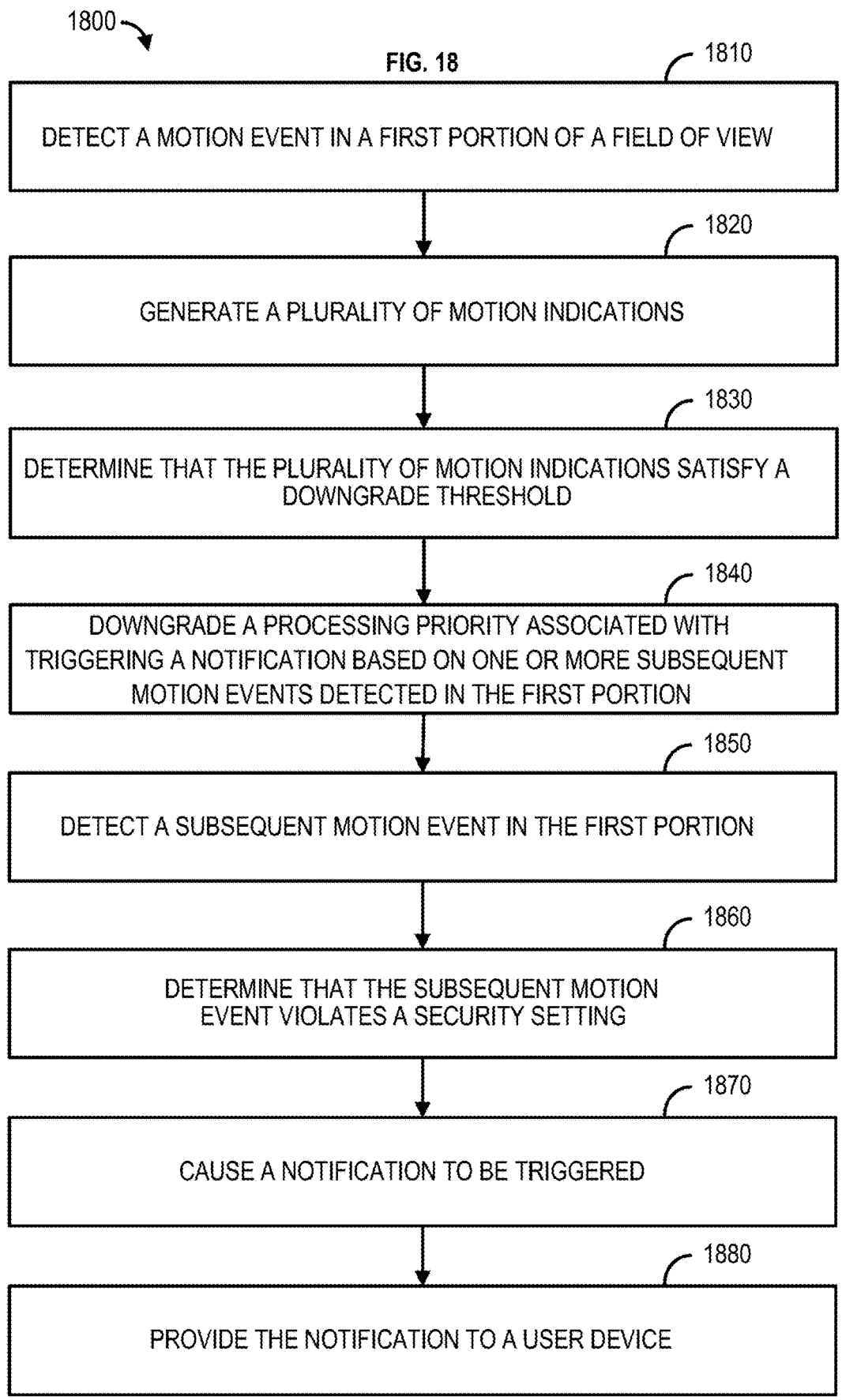
FIG. 18 shows a flowchart of a method according to the present invention.

FIG. 18 is a flowchart of a method 1800. At 1810, a motion event may be detected. The motion event may be detected from content (e.g., a plurality of images, video, etc.) captured by a camera system (e.g., the image capturing device 102, etc.). The camera system may capture video of a scene within its field of view (e.g., field of view of the camera, etc.). The motion event may be detected in a portion of a plurality of portions of the scene within the field of view. The scene within the field of view may be partitioned into different regions of interest, such as a lawn, a porch, a street, and or the like. The regions of interest (e.g., the plurality of portions of the scene) may be selected by a user. The regions of interest (e.g., the plurality of portions of the scene) may be automatically determined by the camera system.

The motion may be detected by determining a change in pixels between sequential frames (e.g., a previous frame and a current frame, etc.) of the video of the scene within the field of view. For each frame of the video a change in pixels from a previous frame may be determined. The camera system may analyze the video and determine whether a plurality of pixels associated with a frame of the video is different from a corresponding plurality of pixels associated with a previous frame of the video. Analysis of the video may be performed in incremental durations of the video, such as at every 15-second interval of the video.

At 1820, a plurality of motion indication parameters may be determined/generated. Each frame of the video determined to have a change in pixels from a previous frame may be tagged with a motion indication parameters. If a change in the plurality of pixels associated with a frame is determined, the frame may be tagged with a motion indication parameter with a predefined value (e.g., 1) at the location in the frame where the change of pixel occurred. If it is determined that no pixels changed (e.g., the pixel(s) and its corresponding pixel(s) is the same, etc.), the frame may be tagged with a motion indication parameter with a different predefined value (e.g., 0). A plurality of frames associated with the video may be determined. The camera system may determine and/or store a plurality of motion indication parameters. The plurality of motion indication parameters may be determined and/or stored over a time period (e.g., a day(s), a week(s), etc.).

At step 1830, the plurality of motion indication parameters may be compared to a downgrade threshold. The camera system may determine that the plurality of motion indication parameters satisfy the downgrade threshold. A given number of motion indication parameters with a value of 1 may satisfy or exceed the downgrade threshold value, such as 100 motion indication parameters with a value of 1 may satisfy/exceed an exclusion threshold value set for 50 motion indication parameters with a value of 1. The downgrade threshold value may be based on any amount or value of motion indication parameters. A portion of the plurality of portions within the field of view of the camera may be determined based on the plurality of motion indication parameters compared to the downgrade threshold.

At step 1840, the camera system may downgrade a processing priority of a portion of the plurality of portions of the scene within the field of view of the camera system based on the downgrade threshold being satisfied. The downgrade threshold may be satisfied based on a high frequency of motion events detected in the portion within an associated timeframe (e.g., 5 motion events detected within a two-hour timeframe). The number of motion events required to satisfy the downgrade threshold, as well as the associated timeframe during which the motion events are detected, may be defined by the camera system or by a user of the camera system. The downgrade threshold may be temporally based such that the downgrade threshold may be satisfied with a fewer number of detected motion events during a first timeframe (e.g., nighttime hours) as compared to a second timeframe (e.g., daytime hours). In this way, a fewer number of detected motion events may satisfy the threshold when they are detected during hours corresponding to a certain timeframe(s). (e.g., nighttime). The number of motion events required to satisfy the downgrade threshold during a certain time period (e.g., nighttime versus daytime), as well as the associated timeframe during which the motion events are detected (e.g., between a time corresponding to dusk and a time corresponding to dawn), may be defined by the camera system or by a user of the camera system.

A downgraded processing priority may be associated with triggering a notification (e.g., a notification sent to a user device) in response to the camera system detecting a motion event with less frequency as compared to a processing priority that has not been downgraded. For a portion having a processing priority that has not been downgraded, a notification may be triggered each time a motion event is detected. For a portion having a downgraded processing priority, a notification may be triggered, despite the processing priority have been downgraded, only in response to determining that one or more security settings have been violated (e.g., a detected motion event violates a security setting(s)). Security settings associated with the camera system may be based on any parameter, such as a number of persons approaching a house, a motion event detected at a certain time of day, a person entering a certain area/region within the field of view of the camera system, and/or the like. The downgraded portion may be excluded based on satisfying the exclusion threshold described above.

At 1850, an object associated with a detected subsequent motion event and action associated with the subsequent motion event may be determined. The camera system (e.g., the image capturing device 102, etc.) may determine the object and action associated with the motion event. The object and action associated with the motion event may be any object and any action, such as such as a person/animal walking towards/from a user's private property, vehicles passing by on a road in front of a home, flags/windmills in motion due to heavy wind, and the like. The camera system may use scene recognition, facial recognition, landmark recognition, spatial recognition, and the like to automatically identify regions, objects, and the like within in a scene within its field of view. The camera system may use a layout-induced video representation (LIVR) method to: determine regions of the scene (e.g., a porch, a street, a lawn, etc.), may abstract away areas (e.g., regions) of the scene where motion is not detected, and use a combination of semantic geometric, and topological analysis to determine the object and the action. The camera system may use the LIVR method to determine that a person if walking towards a home. The LIVR method is described in detail in previous sections of the present disclosure (e.g., FIG. 4-FIG. 9, etc.).

At 1860, it may be determined that the subsequent motion event violates a security setting. The camera system (e.g., the image capturing device 102, etc.) may determine that the subsequent motion event violates a security setting based on the determined object and action. The camera system may determine that a person is walking towards a home. The camera system may determine that the person walking towards the home compromises security settings associated with the camera system. Security settings associated with the camera system may be based on any parameter, such as a number of persons approaching a house, a motion event detected at a certain time, a time of day, a person entering a certain area/region within the field of view of the camera system, and/or the like.

At 1870, the camera system may cause a notification to be provided to a user (e.g., a user device) using any of the communication protocols discussed above with respect to method 1700. The camera system may downgrade a processing priority of a portion of the plurality of portions of the scene within the field of view of the camera system based on the downgrade threshold being satisfied. The downgrade threshold may be satisfied based on a high frequency of motion events detected in the portion within an associated timeframe (e.g., 5 motion events detected within a two-hour timeframe). The number of motion events required to satisfy the downgrade threshold, as well as the associated timeframe during which the motion events are detected, may be defined by the camera system or by a user of the camera system. The downgrade threshold may be temporally based such that the downgrade threshold may be satisfied with a fewer number of detected motion events during a first timeframe (e.g., nighttime hours) as compared to a second timeframe (e.g., daytime hours). In this way, a fewer number of detected motion events may satisfy the threshold when they are detected during hours corresponding to a certain timeframe(s) (e.g., nighttime). The number of motion events required to satisfy the downgrade threshold during a certain time period (e.g., nighttime versus daytime), as well as the associated timeframe during which the motion events are detected (e.g., between a time corresponding to dusk and a time corresponding to dawn), may be defined by the camera system or by a user of the camera system.

A downgraded processing priority may be associated with triggering a notification (e.g., a notification sent to a user device) in response to the camera system detecting a motion event with less frequency as compared to a processing priority that has not been downgraded. For a portion having a processing priority that has not been downgraded, a notification may be triggered each time a motion event is detected. For a portion having a downgraded processing priority, a notification may be triggered, despite the processing priority have been downgraded, only in response to determining that one or more security settings have been violated (e.g., a detected motion event violates a security setting(s)).

At 1880, the camera system may provide a notification to the user that the subsequent motion event violates a security setting. The camera system may provide a notification to the user/user device based on a detection that a person is walking towards the home. The camera system may notify the user (e.g., the user device) via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification. Security settings associated with the camera system may be based on any parameter, such as a number of persons approaching a house, a motion event detected at a certain time of day, a person entering a certain area/region within the field of view of the camera system, and/or the like. The downgraded portion may be excluded based on satisfying the exclusion threshold described above.

The camera system may detect a motion event in a second portion of the plurality of portions. The motion event may be detected from content (e.g., a plurality of images, video, etc.) captured by a camera system (e.g., the image capturing device 102, etc.). The camera system may capture video of a scene within its field of view (e.g., field of view of the camera, etc.). The motion may be detected in the second portion by determining a change in pixels between sequential frames (e.g., a previous frame and a current frame, etc.) of the video of the scene within the field of view. For each frame of the video a change in pixels from a previous frame may be determined. The camera system may analyze the video and determine whether a plurality of pixels associated with a frame of the video is different from a corresponding plurality of pixels associated with a previous frame of the video. Analysis of the video may be performed in incremental durations of the video, such as at every 15-second interval of the video.

A plurality of motion indication parameters may be determined/generated based on the motion event in the second portion. Each frame of the video determined to have a change in pixels from a previous frame may be tagged with a motion indication parameters. If a change in the plurality of pixels associated with a frame is determined, the frame may be tagged with a motion indication parameter with a predefined value (e.g., 1) at the location in the frame where the change of pixel occurred. If it is determined that no pixels changed (e.g., the pixel(s) and its corresponding pixel(s) is the same, etc.), the frame may be tagged with a motion indication parameter with a different predefined value (e.g., 0). A plurality of frames associated with the video may be determined. The camera system may determine and/or store a plurality of motion indication parameters. The plurality of motion indication parameters may be determined and/or stored over a time period (e.g., a day(s), a week(s), etc.).

The plurality of motion indication parameters based on the motion event in the second portion may be compared to a downgrade threshold. The camera system may determine that the plurality of motion indication parameters based on the motion event in the second portion satisfy the downgrade threshold. A given number of motion indication parameters with a value of 1 may satisfy or exceed the downgrade threshold value, such as 100 motion indication parameters with a value of 1 may satisfy/exceed an exclusion threshold value set for 50 motion indication parameters with a value of 1. The downgrade threshold value may be based on any amount or value of motion indication parameters.

The camera system may downgrade a processing priority of the second portion based on the downgrade threshold being satisfied. The downgrade threshold may be satisfied based on a low frequency of motion events detected in the second portion within a timeframe (e.g., 5 motion events detected within a two-hour timeframe). The downgrade threshold may be temporally based. The downgraded second portion may trigger a notification in response to determining that one or more security settings have been violated (e.g., a detected motion event violates a security setting(s)) based on a detected subsequent motion event in the downgraded second portion. Security settings associated with the camera system may be based on any parameter, such as a number of persons approaching a house, a motion event detected at a certain time of day, a person entering a certain area/region within the field of view of the camera system, and/or the like.

The camera system may determine that the subsequent motion event in the downgraded second portion violates a security setting. The camera system (e.g., the image capturing device 102, etc.) may determine that the subsequent motion event violates a security setting based on the determined object and action. The camera system may determine that a person is walking towards a home. The camera system may determine that the person walking towards the home compromises security settings associated with the camera system. Security settings associated with the camera system may be based on any parameter, such as a number of persons approaching a house, a motion event detected at a certain time, a time of day, a person entering a certain area/region within the field of view of the camera system, and/or the like.

The camera system may cause a notification to be provided to a user (e.g., a user device) once it is determined that the subsequent motion event violates the security setting. The camera system may notify the user (e.g., the user device) via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification.

The camera system may exclude the downgraded second portion based on satisfying an exclusion threshold in response to detecting a future motion event in the downgraded second portion (e.g., the future motion event is detected at a later time than when the subsequent motion event is detected). The future motion event may be detected from content (e.g., a plurality of images, video, etc.) captured by a camera system (e.g., the image capturing device 102, etc.). The camera system may capture video of a scene within its field of view (e.g., field of view of the camera, etc.). The scene within the field of view may be partitioned into different portions, such as a lawn, a porch, a street, and or the like. The future motion event may be detected by determining a change in pixels between sequential frames (e.g., a previous frame and a current frame, etc.) of the video of the scene within the field of view. For each frame of the video a change in pixels from a previous frame may be determined. The camera system may analyze the video and determine whether a plurality of pixels associated with a frame of the video is different from a corresponding plurality of pixels associated with a previous frame of the video. Analysis of the video may be performed in incremental durations of the video, such as at every 15-second interval of the video.

A plurality of motion indication parameters may be determined/generated based on the detected future motion event in the downgraded second portion. Each frame of the video determined to have a change in pixels from a previous frame may be tagged with a motion indication parameters. If a change in the plurality of pixels associated with a frame is determined, the frame may be tagged with a motion indication parameter with a predefined value (e.g., 1) at the location in the frame where the change of pixel occurred. If it is determined that no pixels changed (e.g., the pixel(s) and its corresponding pixel(s) is the same, etc.), the frame may be tagged with a motion indication parameter with a different predefined value (e.g., 0). A plurality of frames associated with the video may be determined. The camera system may determine and/or store a plurality of motion indication parameters. The plurality of motion indication parameters may be determined and/or stored over a time period (e.g., a day(s), a week(s), etc.).

The plurality of motion indication parameters based on the detected future motion event in the downgraded second portion may be compared to an exclusion threshold. The camera system may determine that the plurality of motion indication parameters satisfy an exclusion threshold. A given number of motion indication parameters with a value of 1 may satisfy or exceed an exclusion threshold value, such as 100 motion indication parameters with a value of 1 may satisfy/exceed the exclusion threshold value set for 50 motion indication parameters with a value of 1. The exclusion threshold value may be based on any amount or value of motion indication parameters.

The camera system may disable the downgraded second portion from triggering notifications based on the detected future motion event when the exclusion threshold is satisfied. The exclusion threshold may be satisfied based on a high frequency of motion events detected in the downgraded second portion within a short timeframe (e.g., 10 motion events detected within a one-hour timeframe). The exclusion threshold may be temporally based (e.g., a lower threshold during daytime and a higher threshold during nighttime). The camera system may exclude the downgraded second portion from subsequent detections of motion events.

Figure 19:
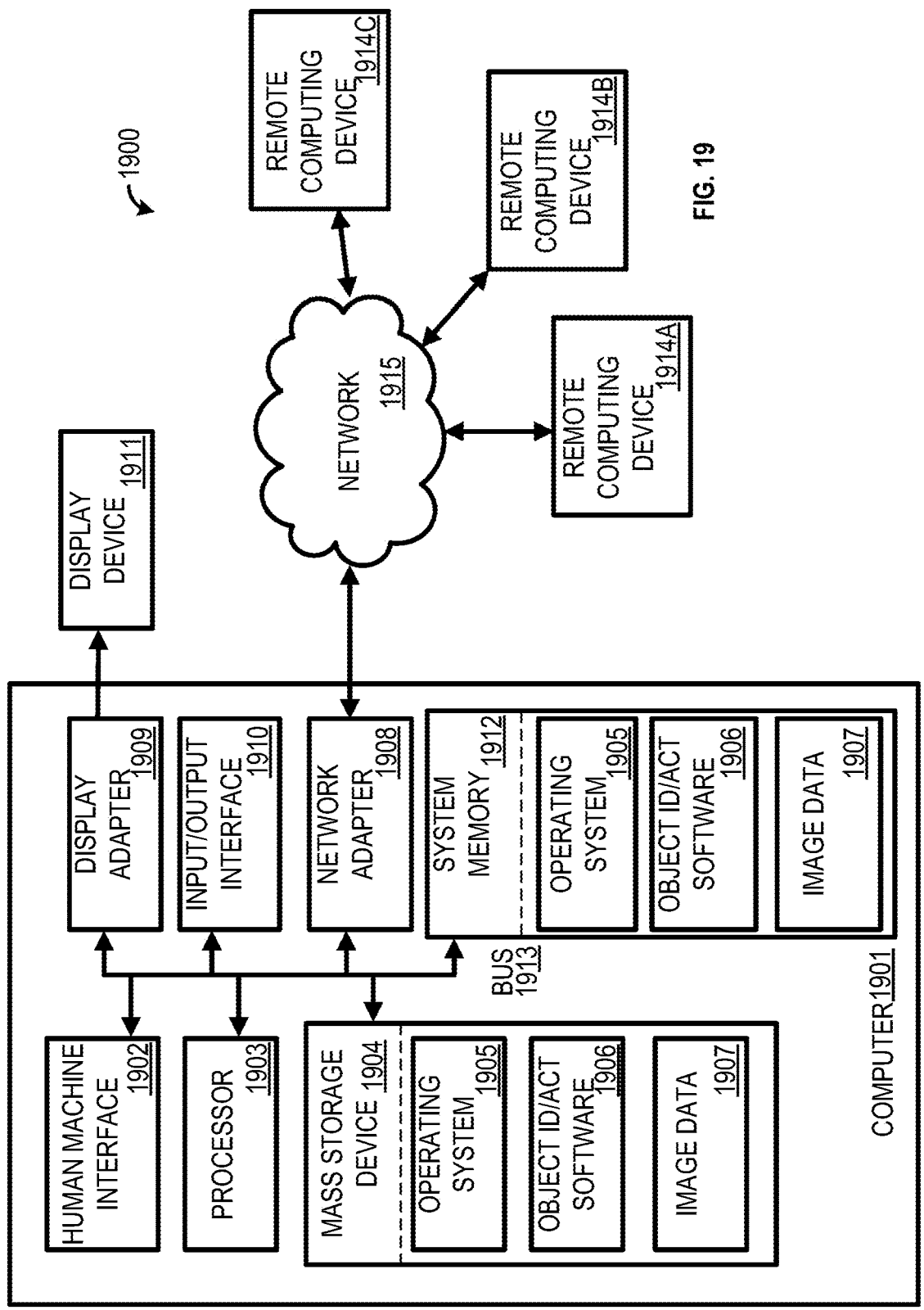
FIG. 19 shows a block diagram of a computing device in which the present methods and systems may operate.

The methods and systems may be implemented on a computer 1901 as shown in FIG. 19 and described below. The image capturing device 102 and the computing device 104 of FIG. 1 may be a computer 1901 as shown in FIG. 19. Similarly, the methods and systems described may utilize one or more computers to perform one or more functions in one or more locations. FIG. 19 is a block diagram of an operating environment for performing the present methods. This operating environment is a single configuration of many possible configurations of an operating environment, and it is not intended to suggest any limitation as to the scope of use or functionality of operating environment architecture. Neither should the operating environment be interpreted as having any dependency or requirement relating to any one or combination of components shown in the operating environment.

The present methods and systems may be operational with numerous other general purpose or special purpose computing system environments or configurations. Well-known computing systems, environments, and/or configurations that may be suitable for use with the systems and methods may be, but are not limited to, personal computers, server computers, laptop devices, and multiprocessor systems. Additional computing systems, environments, and/or configurations are set top boxes, programmable consumer electronics, network PCs, minicomputers, mainframe computers, distributed computing environments that are composed of any of the above systems or devices, and the like.

The processing of the present methods and systems may be performed by software components. The described systems and methods may be described in the general context of computer-executable instructions, such as program modules, being executed by one or more computers or other devices. Generally, program modules are composed of computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 1901. The components of the computer 1901 may be, but are not limited to, one or more processors 1903, a system memory 1912, and a system bus 1913 that couples various system components including the one or more processors 1903 to the system memory 1912. The system may utilize parallel computing.

The system bus 1913 represents one or more of several possible types of bus structures, including a memory bus or memory controller, a peripheral bus, an accelerated graphics port, or local bus using any of a variety of bus architectures. Such architectures may be an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1913, and all buses specified in this description may also be implemented over a wired or wireless network connection and each of the subsystems, including the one or more processors 1903, a mass storage device 1904, an operating system 1905, object identification and action determination software 1906, image data 1907, a network adapter 1908, the system memory 1912, an Input/Output Interface 1910, a display adapter 1909, a display device 1911, and a human machine interface 1902, may be contained within one or more remote computing devices 1914a,b,c at physically separate locations, connected through buses of this form, in effect implementing a fully distributed system.

The computer 1901 is typically composed of a variety of computer readable media. Readable media may be any available media that is accessible by the computer 1901 and may be both volatile and non-volatile media, removable and non-removable media. The system memory 1912 may be computer readable media in the form of volatile memory, such as random access memory (RAM), and/or non-volatile memory, such as read only memory (ROM). The system memory 1912 is typically composed of data such as the image data 1907 and/or program modules such as the operating system 1905 and the object identification and action determination software 1906 that are immediately accessible to and/or are presently operated on by the one or more processors 1903.

The computer 1901 may also be composed of other removable/non-removable, volatile/non-volatile computer storage media. FIG. 19 shows a mass storage device 1904, which may provide non-volatile storage of computer code, computer readable instructions, data structures, program modules, and other data for the computer 1901. The mass storage device 1904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1904, such as the operating system 1905 and the object identification and action determination software 1906. Each of the operating system 1905 and the object identification and action determination software 1906 (or some combination thereof) may be elements of the programming and the object identification and action determination software 1906. The image data 1907 may also be stored on the mass storage device 1904. The image data 1907 may be stored in any of one or more databases known in the art. Such databases are DB2®, Microsoft® Access, Microsoft® SQL Server, Oracle®, MySQL, PostgreSQL, and the like. The databases may be centralized or distributed across multiple systems.

The user may enter commands and information into the computer 1901 via an input device (not shown). Such input devices may be, but are not limited to, a keyboard, pointing device (e.g., a "mouse"), a microphone, a joystick, a scanner, tactile input devices such as gloves, and other body coverings, and the like These and other input devices may be connected to the one or more processors 1903 via the human machine interface 1902 that is coupled to the system bus 1913, but may be connected by other interface and bus structures, such as a parallel port, game port, an IEEE 1394 Port (also known as a Firewire port), a serial port, or a universal serial bus (USB).

The display device 1911 may also be connected to the system bus 1913 via an interface, such as the display adapter 1909. It is contemplated that the computer 1901 may have more than one display adapter 1909 and the computer 1901 may have more than one display device 1911. The display device 1911 may be a monitor, an LCD (Liquid Crystal Display), or a projector. In addition to the display device 1911, other output peripheral devices may be components such as speakers (not shown) and a printer (not shown) which may be connected to the computer 1901 via the Input/Output Interface 1910. Any step and/or result of the methods may be output in any form to an output device. Such output may be any form of visual representation, including, but not limited to, textual, graphical, animation, audio, tactile, and the like. The display device 1911 and computer 1901 may be part of one device, or separate devices.

The computer 1901 may operate in a networked environment using logical connections to one or more remote computing devices 1914*a,b,c*. A remote computing device may be a personal computer, portable computer, smartphone, a server, a router, a network computer, a peer device or other common network node, and so on. Logical connections between the computer 1901 and a remote computing device 1914*a,b,c* may be made via a network 1915, such as a local area network (LAN) and/or a general wide area network (WAN). Such network connections may be through the network adapter 1908. The network adapter 1908 may be implemented in both wired and wireless environments. Such networking environments are conventional and commonplace in dwellings, offices, enterprise-wide computer networks, intranets, and the Internet.

Application programs and other executable program components such as the operating system 1905 are shown herein as discrete blocks, although it is recognized that such programs and components reside at various times in different storage components of the computing device 1901, and are executed by the one or more processors 1903 of the computer. An implementation of the object identification and action determination software 1906 may be stored on or sent across some form of computer readable media. Any of the described methods may be performed by computer readable instructions embodied on computer readable media. Computer readable media may be any available media that may be accessed by a computer. Computer readable media may be "computer storage media" and "communications media." "Computer storage media" may be composed of volatile and non-volatile, removable and non-removable media implemented in any methods or technology for storage of information such as computer readable instructions, data structures, program modules, or other data. Further, computer storage media may be, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and methods and systems described therein be considered exemplary only, with a true scope and spirit being indicated by the following claims.

What is claimed is:

1. A method comprising:
   based on a quantity of motion events in a portion of a field of view satisfying a threshold, associating the portion of the field of view with a reduced notification setting;
   after associating the portion of the field of view with the reduced notification setting, determining a subsequent motion event in the portion of the field of view; and
   based on timing information associated with the subsequent motion event, sending a notification.

2. The method of claim 1, wherein the threshold is a frequency threshold, wherein the reduced notification setting is configured to prevent sending the notification, and wherein the timing information indicates a time of day.

3. The method of claim 1, further comprising determining one or more of: a speed, a location, or a trajectory of the subsequent motion event.

4. The method of claim 1, further comprising assigning, to the portion of the field of view, a semantic label.

5. The method of claim 1, further comprising determining an object associated with the subsequent motion event.

6. A method comprising:
   based on a quantity of motion events associated with a portion of a field of view satisfying a threshold, associating the portion of the field of view with a reduced notification setting;
   after associating the portion of the field of view with the reduced notification setting, determining a subsequent motion event in the portion of the field of view; and
   withholding, based on timing information associated with the subsequent motion event and the reduced notification setting, a notification associated with the subsequent motion event.

7. The method of claim 6, wherein the threshold is a frequency threshold, wherein the reduced notification setting is configured to prevent sending the notification, and wherein the timing information indicates a time of day.

8. The method of claim 6, further comprising determining one or more of: a speed, a location, or a trajectory associated with the subsequent motion event.

9. The method of claim 6, further comprising assigning, to the portion of the field of view, a semantic label.

10. The method of claim 6, further comprising determining an object associated with the subsequent motion event.

11. An apparatus comprising:
one or more processors; and
memory storing processor executable instructions that, when executed by the one or more processors, cause the apparatus to:
based on a quantity of motion events in a portion of a field of view satisfying a threshold, associate the portion of the field of view with a reduced notification setting;
after associating the portion of the field of view with the reduced notification setting, determine a subsequent motion event in the portion of the field of view; and
based on timing information associated with the subsequent motion event, send a notification.

12. The apparatus of claim 11, wherein the threshold is a frequency threshold, wherein the reduced notification setting is configured to prevent sending the notification, and wherein the timing information indicates a time of day.

13. The apparatus of claim 11, wherein the processor executable instructions, when executed by the one or more processors, further cause the apparatus to determine one or more of: a speed, a location, or a trajectory associated with the subsequent motion event.

14. The apparatus of claim 11, wherein the processor executable instructions, when executed by the one or more processors, further cause the apparatus to assign, to the portion of the field of view, a semantic label.

15. The apparatus of claim 11, wherein the processor executable instructions, when executed by the one or more processors, further cause the apparatus to determine an object associated with the subsequent motion event.

16. An apparatus comprising:
one or more processors; and
memory storing processor executable instructions that, when executed by the one or more processors, cause the apparatus to:
based on a quantity of motion events associated with a portion of a field of view satisfying a threshold, associate the portion of the field of view with a reduced notification setting;
after associating the portion of the field of view with the reduced notification setting, determine a subsequent motion event in the portion of the field of view; and
withhold, based on timing information associated with the subsequent motion event and the reduced notification setting, a notification associated with the subsequent motion event.

17. The apparatus of claim 16, wherein the threshold is a frequency threshold, wherein the reduced notification setting is configured to prevent sending the notification, and wherein the timing information indicates a time of day.

18. The apparatus of claim 16, wherein the processor executable instructions, when executed by the one or more processors, further cause the apparatus to determine one or more of: a speed, a location, or a trajectory associated with the subsequent motion event.

19. The apparatus of claim 16, wherein the processor executable instructions, when executed by the one or more processors, further cause the apparatus to assign, to the portion of the field of view, a semantic label.

20. The apparatus of claim 16, wherein the processor executable instructions, when executed by the one or more processors, further cause the apparatus to determine an object associated with the subsequent motion event.

21. One or more non-transitory computer-readable media storing processor executable instructions that, when executed by at least one processor, cause the at least one processor to:
based on a quantity of motion events in a portion of a field of view satisfying a threshold, associate the portion of the field of view with a reduced notification setting;
after associating the portion of the field of view with the reduced notification setting, determine a subsequent motion event in the portion of the field of view; and
based on timing information associated with the subsequent motion event, send a notification.

22. The one or more non-transitory computer-readable media of claim 21, wherein the threshold is a frequency threshold, wherein the reduced notification setting is configured to prevent sending the notification, and wherein the timing information indicates a time of day.

23. The one or more non-transitory computer-readable media of claim 21, wherein the processor executable instructions, when executed by the at least one processor, further cause the at least one processor to determine one or more of: a speed, a location, or a trajectory associated with the subsequent motion event.

24. The one or more non-transitory computer-readable media of claim 21, wherein the processor executable instructions, when executed by the at least one processor, further cause the at least one processor to assign, to the portion of the field of view, a semantic label.

25. The one or more non-transitory computer-readable media of claim 21, wherein the processor executable instructions, when executed by the at least one processor, further cause the at least one processor to determine an object associated with the subsequent motion event.

26. One or more non-transitory computer-readable media storing processor executable instructions that, when executed by at least one processor, cause the at least one processor to:
based on a quantity of motion events associated with a portion of a field of view satisfying a threshold, associate the portion of the field of view with a reduced notification setting;
after associating the portion of the field of view with the reduced notification setting, determine a subsequent motion event in the portion of the field of view; and
withhold, based on timing information associated with the subsequent motion event and the reduced notification setting, a notification associated with the subsequent motion event.

27. The one or more non-transitory computer-readable media of claim 26, wherein the threshold is a frequency threshold, wherein the reduced notification setting is configured to prevent sending the notification, and wherein the timing information indicates a time of day.

28. The one or more non-transitory computer-readable media of claim 26, wherein the processor executable instructions, when executed by the at least one processor, further cause the at least one processor to determine one or more of: a speed, a location, or a trajectory associated with the subsequent motion event.

29. The one or more non-transitory computer-readable media of claim 26, wherein the processor executable instructions, when executed by the at least one processor, further cause the at least one processor to assign, to the portion of the field of view, a semantic label.

30. The one or more non-transitory computer-readable media of claim 26, wherein the processor executable instructions, when executed by the at least one processor, further cause the at least one processor to determine an object associated with the subsequent motion event.

\* \* \* \* \*